(12) United States Patent
Mitsunobu et al.

(10) Patent No.: US 12,571,074 B2
(45) Date of Patent: *\*Mar. 10, 2026**

(54) PLATED STEEL MATERIAL

(71) Applicant: NIPPON STEEL CORPORATION,
Tokyo (JP)

(72) Inventors: Takuya Mitsunobu, Tokyo (JP);
Kotaro Ishii, Tokyo (JP); **Mamoru
Saito, Tokyo (JP); Hiroshi
Takebayashi**, Tokyo (JP)

(73) Assignee: NIPPON STEEL CORPORATION,
Tokyo (JP)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/647,778

(22) Filed: Apr. 26, 2024

(65) Prior Publication Data

US 2025/0333820 A1      Oct. 30, 2025

(51) Int. Cl.
*C22C 18/04*       (2006.01)
*B32B 15/01*       (2006.01)
(Continued)

(52) U.S. Cl.
CPC .............. *C22C 18/04* (2013.01); *B32B 15/01*
(2013.01); *B32B 15/012* (2013.01);
(Continued)

(58) Field of Classification Search
CPC ......... C22C 18/04; C22C 18/00; C22C 30/06;
C23C 2/024; C23C 2/04; C23C 2/06;
C23C 2/29; C23C 2/30; C23C 2/405;
C23C 2/40; C23C 28/025; C23C 28/023;
C23C 28/322; C23C 28/3225; C23C 30/00; C23C 30/005; B32B 15/01; B32B
15/012; B32B 15/013; B32B 15/04; B32B
15/043; B32B 15/18; B32B 15/20; Y10T
428/12757;
(Continued)

(56) References Cited

U.S. PATENT DOCUMENTS

2022/0112589 A1      4/2022  Mitsunobu et al.
2022/0341017 A1*   10/2022  Kim ...................... B32B 15/043

FOREIGN PATENT DOCUMENTS

JP         7-207421  A       8/1995
JP      2002-47548  A       2/2002
(Continued)

*Primary Examiner* — Michael E. La Villa
(74) *Attorney, Agent, or Firm* — Birch, Stewart, Kolasch
& Birch, LLP

(57) ABSTRACT

A plated steel material including a plated layer and a base
steel material. In a cross section perpendicular to a surface
of the plated steel material, a length L of a boundary line
between the plated layer and the base steel material satisfies
$(L-L_0)/L_0 \times 100 \geq 2.0$ (%), wherein $L_0$ is a linear distance
between ends of the boundary line in an observation region,
and L is a length of the boundary line between the ends. The
plated layer includes a first region where an Fe concentration
is less than 5.0 mass %, a second region where an Fe
concentration is 5.0 mass % or more and less than 30.0 mass
%, and a third region where an Fe concentration is 30.0 mass
% or more and 80.0 mass % or less, the first region including
an Al-containing phase at an area fraction of 0% and less
than 5%.

16 Claims, 3 Drawing Sheets

(51) Int. Cl.

| | |
|---|---|
| *B32B 15/04* | (2006.01) |
| *B32B 15/18* | (2006.01) |
| *B32B 15/20* | (2006.01) |
| *C22C 18/00* | (2006.01) |
| *C22C 30/06* | (2006.01) |
| *C23C 2/02* | (2006.01) |
| *C23C 2/04* | (2006.01) |
| *C23C 2/06* | (2006.01) |
| *C23C 2/28* | (2006.01) |
| *C23C 2/30* | (2006.01) |
| *C23C 2/40* | (2006.01) |
| *C23C 28/00* | (2006.01) |
| *C23C 28/02* | (2006.01) |
| *C23C 30/00* | (2006.01) |

(52) U.S. Cl.

CPC ............ *B32B 15/013* (2013.01); *B32B 15/04* (2013.01); *B32B 15/043* (2013.01); *B32B 15/18* (2013.01); *B32B 15/20* (2013.01); *C22C 18/00* (2013.01); *C22C 30/06* (2013.01); *C23C 2/024* (2022.08); *C23C 2/04* (2013.01); *C23C 2/06* (2013.01); *C23C 2/29* (2022.08); *C23C 2/30* (2013.01); *C23C 2/40* (2013.01); *C23C 2/405* (2013.01); *C23C 28/023* (2013.01); *C23C 28/025* (2013.01); *C23C 28/322* (2013.01); *C23C 28/3225* (2013.01); *C23C 30/00* (2013.01); *C23C 30/005* (2013.01); *Y10T 428/12757* (2015.01); *Y10T 428/12799* (2015.01); *Y10T 428/12972* (2015.01); *Y10T 428/24942* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(58) Field of Classification Search

CPC ..... Y10T 428/12799; Y10T 428/12972; Y10T 428/24967; Y10T 428/24942; Y10T 428/2495; Y10T 428/263; Y10T 428/264; Y10T 428/265

See application file for complete search history.

(56) References Cited

FOREIGN PATENT DOCUMENTS

| | | |
|---|---|---|
| JP | 2002-322537 A | 11/2002 |
| JP | 2009-120947 A | 6/2009 |
| JP | 2021-4403 A | 1/2021 |
| KR | 10-2015-0066339 A | 6/2015 |
| WO | WO 2020/213687 A1 | 10/2020 |

* cited by examiner

PLATED STEEL MATERIAL

TECHNICAL FIELD

The present invention relates to a plated steel material.

BACKGROUND ART

For instance, steel structures are used in the fields of civil engineering and infrastructure. Steel structures are exposed to severe corrosion environments, such as coastal areas and areas where snow-melting salts are sprayed. Therefore, a stainless steel material is used to suppress corrosion over a long period of time and maintain steel structures.

On the other hand, high-cost alloying elements such as Cr or Ni are used for the stainless steel material. Therefore, it is a problem that installation of a steel structure using the stainless steel material is costly. Therefore, pre-plated products (for instance, Zn—Al—Mg-based plated steel materials) have been used as a substitute for stainless steel materials.

However, in a large steel structure, a pipe-shaped steel structure, or the like, the plated layer may disappear due to welding, and the plated layer may partially disappear due to corrosion or the like from the cut end surface. Furthermore, it is fundamentally difficult to manufacture steel material parts such as bolts and washers from a sheet member.

From the above, large steel structures, pipe-shaped steel structures, steel material parts such as bolts and washers, and the like are generally manufactured by subjecting a steel material processed into a predetermined shape to post-plating treatment (so-called dipping plating treatment).

As the post-plating treatment, hot-dip Zn plating treatment is widely used, but in recent years, Zn—Al—Mg-based plating treatment has also been used in order to improve corrosion resistance.

Patent Document 1 discloses a plated steel material including: a steel material; and a plated layer including: a surface plated layer which is arranged on the surface of the steel material and includes a Zn—Al—Mg alloy layer where the Fe concentration is less than 3 mass %; an intermediate plated layer which is arranged between the steel material and the surface plated layer and includes a Zn—Al—Mg alloy layer where the Fe concentration is 3 mass % or more and less than 30 mass %, and where the layer thickness is 3 μm or more; and an interface alloy layer which is arranged between the steel material and the intermediate plated layer, wherein the total layer thickness of the surface plated layer and the intermediate plated layer is 8 μm or more and less than 300 μm, the plated layer includes, as an average chemical composition, in terms of mass %, more than 65.00% of Zn, more than 6.5% to less than 22.5% of Al, more than 3.0% to less than 12% of Mg, and impurities, and the Mg concentration of the intermediate plated layer is more than 3.0% in terms of mass %.

RELATED ART DOCUMENTS

Patent Documents

Patent Document 1: Japanese Unexamined Patent Application, First Publication No. 2021-4403

SUMMARY OF INVENTION

Technical Problem to be Solved

Recently, it has been studied to use a plated steel material, which has been subjected to dipping plating of a steel material, not only in the fields of civil engineering and infrastructure but also as a material for automobile parts. When the plated steel material is used as a material of an automobile component, it is required to improve adhesion of the plated layer, corrosion resistance after coating, base metal corrosion resistance, and sacrificial corrosion resistance.

Although the plated steel material disclosed in Patent Document 1 is excellent in red rust resistance, adhesion of the plated layer, corrosion resistance after coating, base metal corrosion resistance, and sacrificial corrosion resistance are not mentioned at all.

Therefore, an object of the present invention is to provide a plated steel material which is excellent in adhesion of the plated layer, corrosion resistance after coating, red rust resistance, base metal corrosion resistance, and sacrificial corrosion resistance.

Solution to Problem

In order to solve the above problem, the present invention employs the following features.

[1] A plated steel material including: a base steel material; and a plated layer arranged on a surface of the base steel material, wherein the plated layer includes, as a chemical composition, in terms of mass %, 5.0 to 40.0% of Al, 0.5 to 15.0% of Mg, 5.0 to 40.0% of Fe, 0 to 2.0% of Si, and 0 to 2.0% of Ca, and further includes one or more selected from a group consisting of following group A and group B, and a balance including Zn and impurities, in a cross section perpendicular to a surface of the plated steel material, when observing an observation region which is a cross section of the plated steel material having a predetermined length in a direction parallel to the surface of the plated steel material, a length L of a boundary line between the plated layer and the base steel material satisfies a following formula (1), the plated layer includes a first region which is arranged at the surface of the plated steel material and where an Fe concentration is less than 5.0 mass %, a second region which is adjacent to the first region and where an Fe concentration is 5.0 mass % or more and less than 30.0 mass %, and a third region which is arranged between the second region and the base steel material and where an Fe concentration is 30.0 mass % or more and 80.0 mass % or less, a thickness of the first region is 5 to 100 μm, a thickness of the second region is 5 to 100 μm, a thickness of the third region is 5 to 100 μm, and the first region includes an Al-containing phase at an area fraction of 0% or more and less than 5%, the Al-containing phase including Zn and 20 to 99 mass % of Al;

herein,

[Group A] 0 to 1.0% of Ni,

[Group B] 0 to 5% in total of one or more of 0 to 0.5% of Sb, 0 to 0.5% of Pb, 0 to 1.0% of Cu, 0 to 2.0% of Sn, 0 to 1.0% of Ti, 0 to 1.0% of Cr, 0 to 1.0% of Nb, 0 to 1.0% of Zr, 0 to 1.0% of Mn, 0 to 1.0% of Mo, 0 to 1.0% of Ag, 0 to 1.0% of Li, 0 to 0.5% of La, 0 to 0.5% of Ce, 0 to 0.5% of B, 0 to 0.5% of Y, 0 to 0.5% of P, 0 to 0.5% of Sr, 0 to 0.5% of Co, 0 to 0.5% of Bi, 0 to 0.5% of In, 0 to 0.5% of V, and 0 to 0.5% of W;

$$(L - L_0)/L_0 \times 100 \geq 2.0 (\%), \qquad (1)$$

herein, in the formula (1), $L_0$ is a linear distance between one end and another end of the boundary line in the observation region, and L is a length of the boundary line between the one end and the other end.

[2] The plated steel material according to [1], wherein a following formula (2) is satisfied, $$(L - L_0)/L_0 \times 100 \geq 4.0 (\%), \qquad (2)$$

herein, in the formula (2), $L_0$ is a linear distance between one end and another end of the boundary line in the observation region, and Lis a length of the boundary line between the one end and the other end.

[3] The plated steel material according to [1], wherein a following formula (3) is satisfied, $$(L - L_0)/L_0 \times 100 \geq 6.0 (\%), \qquad (3)$$

herein, in the formula (3), $L_0$ is a linear distance between one end and another end of the boundary line in the observation region, and L is a length of the boundary line between the one end and the other end.

[4] The plated steel material according to any one of [1] to [3], wherein the thickness of the first region is 15 to 100 μm.

[5] The plated steel material according to any one of [1] to [3], wherein the area fraction of the Al-containing phase in the first region is less than 1%.

[6] The plated steel material according to any one of [1] to [3], wherein the first region includes a Mg—Zn phase including Zn and 20 to 60 mass % of Mg, and an area fraction of the Mg—Zn phase in the first region is 2% or more.

[7] The plated steel material according to any one of [1] to [3], wherein the first region includes a binary eutectic structure of a Zn phase and a Mg—Zn phase, and an area fraction of the binary eutectic structure in the first region is 1% or more.

[8] The plated steel material according to any one of [1] to [3], wherein the thickness of the second region is 15 to 100 μm.

[9] The plated steel material according to any one of [1] to [3], wherein the second region includes a Mg—Zn phase including Zn and 20 to 60 mass % of Mg, and an area fraction of the Mg—Zn phase in the second region is 5% or more.

[10] The plated steel material according to any one of [1] to [3], wherein the second region includes an Fe—Al alloy phase having an equivalent circle diameter of 15 μm or less and an aspect ratio of 2 or more, and an area fraction of the Fe—Al alloy phase in the second region is 5% or more.

[11] The plated steel material according to any one of [1] to [3], wherein the second region includes a binary eutectic structure of a Zn phase and a Mg—Zn phase, and an area fraction of the binary eutectic structure in the second region is 2% or more.

[12] The plated steel material according to any one of [1] to [3], wherein the thickness of the third region is 15 to 100 μm.

[13] The plated steel material according to any one of [1] to [3], wherein the third region includes a Mg—Zn phase including Zn and 20 to 60 mass % of Mg, and an area fraction of the Mg—Zn phase in the third region is 10% or more.

[14] The plated steel material according to any one of [1] to [3], wherein, in the chemical composition of the plated layer, a content percentage of Mg to a total amount of Zn and Mg (Mg/(Zn+Mg) (%)) is 5.0% or more.

[15] The plated steel material according to any one of [1] to [3], wherein, in the chemical composition of the plated layer, a content percentage of Mg to a total amount of Zn and Mg (Mg/(Zn+Mg) (%)) is 6.5% or more.

[16] The plated steel material according to any one of [1] to [3], wherein the plated layer includes 0.02 to 2.0 mass % of Sn, and the plated layer includes a $Mg_2Sn$ phase.

Effects of Invention

According to the present invention, it is possible to provide a plated steel material which is excellent in adhesion of the plated layer, corrosion resistance after coating, red rust resistance, base metal corrosion resistance, and sacrificial corrosion resistance.

DETAILED DESCRIPTION OF PREFERRED EMBODIMENTS

Figure 1:
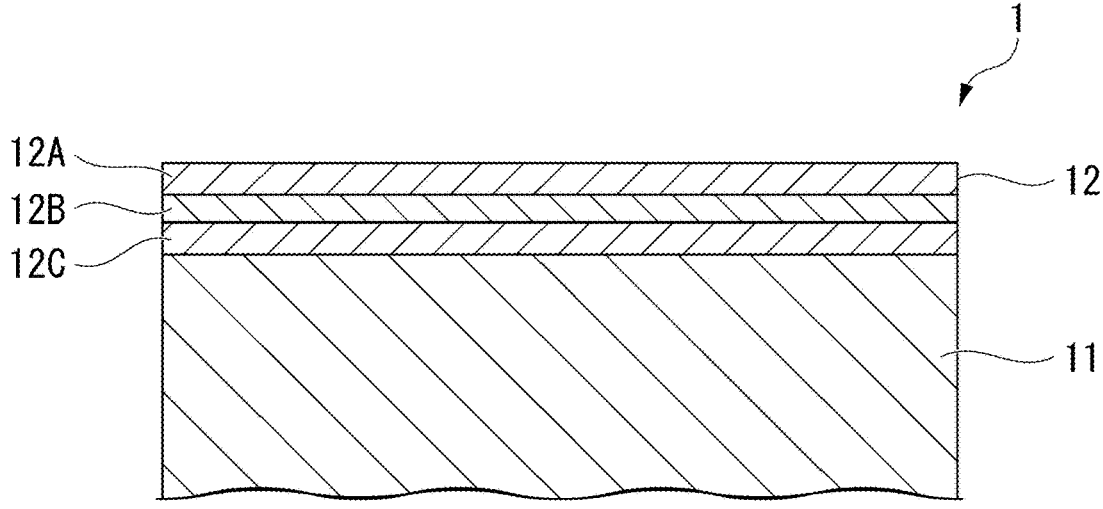
FIG. 1 is a schematic cross-sectional illustration showing a plated steel material according to an embodiment of the present invention.

The present inventors studied to provide a plated steel material which is excellent in adhesion of the plated layer, corrosion resistance after coating, red rust resistance, base metal corrosion resistance, and sacrificial corrosion resistance.

The plated steel material disclosed in Patent Document 1 may include an interface alloy layer having a thickness of 1 to 5 μm. In the plated steel material disclosed in Patent Document 1, the plated layer has an extremely low adhesion and workability when a thick interface alloy layer is formed. Therefore, the thickness of the interface alloy layer is limited to 5 μm or less. However, the present inventors have found that a layer including a large amount of Fe, such as the interface alloy layer, may improve base metal corrosion resistance by a barrier effect. Therefore, the present inventors have successfully improved base metal corrosion resistance without reducing adhesion of the plated layer, and enhanced corrosion resistance after coating, red rust resistance, and sacrificial corrosion resistance, by forming a thick layer including a large amount of Fe between the Mg—Al—Zn-based alloy layer and the base steel material and, at the same time, controlling the form of the interface between the layer including a large amount of Fe and the base steel material.

More specifically, the present inventors have found that a plated steel material excellent in corrosion resistance after coating, adhesion of the plated layer, red rust resistance, base metal corrosion resistance, and sacrificial corrosion resistance can be obtained by imparting strain to the surface of the base steel material before the plated layer is formed on the base steel material through dipping plating treatment, and by controlling the cooling conditions after being pulled up from the plating bath to control the form of the interface between the base steel material and the plated layer. In addition, the present inventors have found that, in the surface of the plated layer, the Al-containing phase is suppressed to be precipitated, and the Fe concentration is suppressed to be low, whereby corrosion resistance after coating and base metal corrosion resistance can be further improved.

Hereinafter, the plated steel material according to an embodiment of the present invention will be described.

The plated steel material according to the embodiment includes: a base steel material; and a plated layer arranged on a surface of the base steel material, wherein the plated layer includes, as a chemical composition, in terms of mass %, 5.0 to 40.0% of Al, 0.5 to 15.0% of Mg, 5.0 to 40.0% of Fe, 0 to 2.0% of Si, and 0 to 2.0% of Ca, and further includes one or more selected from a group consisting of following group A and group B, and a balance including Zn and impurities, in a cross section perpendicular to a surface of the plated steel material, when observing an observation region which is a cross section of the plated steel material having a predetermined length in a direction parallel to the surface of the plated steel material, a length L of a boundary line between the plated layer and the base steel material satisfies a following formula (1), the plated layer includes a first region which is arranged at the surface of the plated steel material and where an Fe concentration is less than 5.0 mass %, a second region which is adjacent to the first region and where an Fe concentration is 5.0 mass % or more and less than 30.0 mass %, and a third region which is arranged between the second region and the base steel material and where an Fe concentration is 30.0 mass % or more and 80.0 mass % or less, a thickness of the first region is 5 to 100 μm, a thickness of the second region is 5 to 100 μm, a thickness of the third region is 5 to 100 μm, and the first region includes an Al-containing phase at an area fraction of 0% or more and less than 5%, the Al-containing phase including Zn and 20 to 99 mass % of Al; herein,

[Group A] 0 to 1.0% of Ni,

[Group B] 0 to 5% in total of one or more of 0 to 0.5% of Sb, 0 to 0.5% of Pb, 0 to 1.0% of Cu, 0 to 2.0% of Sn, 0 to 1.0% of Ti, 0 to 1.0% of Cr, 0 to 1.0% of Nb, 0 to 1.0% of Zr, 0 to 1.0% of Mn, 0 to 1.0% of Mo, 0 to 1.0% of Ag, 0 to 1.0% of Li, 0 to 0.5% of La, 0 to 0.5% of Ce, 0 to 0.5% of B, 0 to 0.5% of Y, 0 to 0.5% of P, 0 to 0.5% of Sr, 0 to 0.5% of Co, 0 to 0.5% of Bi, 0 to 0.5% of In, 0 to 0.5% of V, and 0 to 0.5% of W;

$$(L - L_0)/L_0 \times 100 \geq 2.0(\%), \tag{1}$$

herein, in the formula (1), $L_0$ is a linear distance between one end and another end of the boundary line in the observation region, and L is a length of the boundary line between the one end and the other end.

The plated steel material according to the embodiment preferably satisfies a following formula (2).

$$(L - L_0)/L_0 \times 100 \geq 4.0(\%) \tag{2}$$

The plated steel material according to the embodiment preferably satisfies a following formula (3).

$$(L - L_0)/L_0 \times 100 \geq 6.0(\%) \tag{3}$$

Herein, in the formulae (2) and (3), $L_0$ is a linear distance between one end and another end of the boundary line in the observation region, and L is a length of the boundary line between the one end and the other end.

The thickness of the first region is preferably 15 to 100 μm.

The area fraction of the Al-containing phase included in the first region is preferably less than 1%.

The first region preferably includes a Mg—Zn phase including Zn and 20 to 60 mass % of Mg, and an area fraction of the Mg—Zn phase in the first region is preferably 2% or more.

The first region preferably includes a binary eutectic structure of a Zn phase and a Mg—Zn phase, and an area fraction of the binary eutectic structure in the first region is preferably 1% or more.

The thickness of the second region is preferably 15 to 100 μm.

The second region preferably includes a Mg—Zn phase including Zn and 20 to 60 mass % of Mg, and an area fraction of the Mg—Zn phase in the second region is preferably 5% or more.

The second region preferably includes an Fe—Al alloy phase having an equivalent circle diameter of 15 μm or less and an aspect ratio of 2 or more, and an area fraction of the Fe—Al alloy phase in the second region is preferably 5% or more.

The second region preferably includes a binary eutectic structure of a Zn phase and a Mg—Zn phase, and an area fraction of the binary eutectic structure in the second region is preferably 2% or more.

The thickness of the third region is preferably 15 to 100 μm.

The third region preferably includes a Mg—Zn phase including Zn and 20 to 60 mass % of Mg, and an area fraction of the Mg—Zn phase in the third region is preferably 10% or more.

In the chemical composition of the plated layer, a content percentage of Mg to a total amount of Zn and Mg (Mg/(Zn+Mg) (%)) is preferably 5.0% or more.

In the chemical composition of the plated layer, a content percentage of Mg to a total amount of Zn and Mg (Mg/(Zn+Mg) (%)) is preferably 6.5% or more.

The plated layer preferably includes 0.02 to 2.0 mass % of Sn, and the plated layer preferably includes a $Mg_2Sn$ phase.

In the following description, the expression "%" of an amount of each element in a chemical composition indicates "mass %". An amount of an element in a chemical composition may be referred to as an element concentration (for instance, Zn concentration, Mg concentration, and the like).

The "adhesion of the plated layer" refers to a property that the plated layer is hardly exfoliated.

The "corrosion resistance after coating" refers to a property that the plated layer itself is hardly corroded when the surface of the plated layer is coated.

The "red rust resistance" refers to a property that red rust is suppressed to proceed in the plated layer when the plated layer is corroded.

The "base metal corrosion resistance" refers to a property that the plated layer itself is hardly corroded.

The "sacrificial corrosion resistance" refers to a property that the base steel material is suppressed to be corroded at an area where the base steel material is exposed (for instance, an end surface where the plated steel material is cut, an area where the plated layer is cracked due to processing, and an area where the base steel material is exposed due to exfoliation of the plated layer).

As shown in FIG. 1, a plated steel material 1 according to the embodiment includes a base steel material 11. The shape of the base steel material 11 is not particularly limited, and instances of the shape of the base steel material 11 include a steel sheet, an angled material having an L-shaped cross section, and an expanded metal. The base steel material 11 may be, for instance, a formed base steel material, such as a steel pipe, a civil engineering and construction material (fence culvert, corrugated pipe, drain channel lid, splash-preventing plate, bolt, wire mesh, guard rail, water stop wall, and the like), a home electric appliance member (a housing of an outdoor unit of an air conditioner, or the like), and an automobile component (a suspension member, or the like). The base steel material 11 may be made of a formed article obtained by forming a steel sheet into a predetermined shape. Further, the base steel material 11 may be formed into, for instance, a shape of an automobile component by mutually welding two or more formed articles obtained by forming a steel sheet into a predetermined shape. The forming is, for instance, various plastic working methods, such as press, roll forming, and bending.

The material of the base steel material 11 is not particularly limited. The base steel material 11 may be, for instance, various steel materials, such as general steel, Al-killed steel, ultra-low carbon steel, high carbon steel, various high tensile strength steels, and some high alloy steels (a steel including a reinforcing element such as Ni, Cr, etc.). The base steel material 11 may be a hot-rolled steel sheet, a hot-rolled steel strip, a cold-rolled steel sheet, a cold-rolled steel strip, and the like described in JIS G 3302:2010. The method of producing the steel sheet (hot rolling method, pickling method, cold rolling method, etc.), specific production conditions thereof, and the like are also not particularly limited.

The base steel material 11 for an original sheet to be plated may be a pre-plated steel material obtained by pre-plating the surface of the base steel material 11. An instance of the pre-plated steel material is a Ni pre-plated steel material obtained by Ni-plating the surface of the base steel material 11. The pre-plated steel material is obtained by, for instance, electrolytic treatment or displacement plating. The electrolytic treatment is performed by immersing the base steel material 11 in a sulfuric acid bath or a chloride bath including metal ions of various pre-plating components to perform an electrolytic treatment. The displacement plating is performed by immersing the base steel material in an aqueous solution including metal ions of various pre-plating components and having a pH adjusted with sulfuric acid to substitute and deposit the metals.

The plated steel material 1 according to the embodiment has a plated layer 12 arranged on the surface of the base steel material 11. As described later, the plated layer 12 includes a first region 12A where the Fe concentration is less than 5.0 mass %, a second region 12B where the Fe concentration is 5.0 mass % or more and less than 30.0 mass %, and a third region 12C where the Fe concentration is 30.0 mass % or more and 80.0 mass % or less. The plated layer 12 including the first region 12A, the second region 12B, and the third region 12C includes, as a chemical composition, Zn and other alloying elements, and may further include impurities. The plated layer 12 may include Zn, other alloying elements, and a balance consisting of impurities.

The chemical composition of the plated layer will be described in detail below. Note that the element whose lower limit of the concentration is 0% explained below is not essential for solving the problem of the plated steel material according to the present embodiment, but is an optional element which is allowed to be included in the plated layer for the purpose of, for instance, improving characteristics.

Al: 5.0 to 40.0%

Al contributes to improvement in red rust resistance, base metal corrosion resistance, and sacrificial corrosion resistance. Therefore, the Al concentration is 5.0% or more. The Al concentration may be 10.0% or more, 15.0% or more, or 20.0% or more. On the other hand, when the Al concentration is excessive, the Mg concentration and the Zn concentration relatively decrease, and in particular, sacrificial corrosion resistance may deteriorate. In addition, the appearance of the plated layer may be significantly deteriorated. Therefore, the Al concentration is 40.0% or less. The Al concentration may be 35.0% or less or 30.0% or less.

Mg: 0.5 to 15.0%

Mg is an element essential for securing corrosion resistance after coating and sacrificial corrosion resistance. Mg is necessary to crystallize a $MgZn_2$ phase. Therefore, the Mg concentration is 0.5% or more. The Mg concentration may be 2.0% or more, 3.0% or more, or 4.0% or more. On the other hand, when the Mg concentration is excessive, workability, particularly powdering resistance, may be deteriorated, and further base metal corrosion resistance may be deteriorated. In addition, the appearance of the plated layer may be significantly deteriorated. Therefore, the Mg concentration is 15.0% or less. The Mg concentration may be 10.0% or less or 8.0% or less.

Mg/(Zn+Mg): 5.0% or More or 6.5% or More

In the chemical composition of the plated layer, the content percentage of Mg to the total amount of Zn and Mg (Mg/(Zn+Mg) (%)) may be 5.0% or more, and may be 6.5% or more. This makes it possible to further enhance sacrificial corrosion resistance. Mg and Zn in (Mg/(Zn+Mg)) are the Mg concentration and the Zn concentration in the plated layer, respectively.

Fe: 5.0 to 40.0%

In the plated layer of the embodiment, the first region, the second region, and the third region include a certain amount of Fe. Most of the Fe is included in the plated layer by diffusing into the plated layer from the base steel material, which is an original sheet to be plated. It has been confirmed that when the Fe concentration is 40.0% or less, Fe included in the plated layer does not adversely affect the performance. Since most of the Fe is often present as an Al—Fe alloy phase in the second region and the third region, the Fe concentration tends to increase as the thickness of the second region or the third region increases. When the Fe concentration is less than 5.0%, base metal corrosion resistance may be deteriorated in the later stage of corrosion of the plated layer. Therefore, the Fe concentration is in the range of 5.0 to 40.0%. The Fe concentration may be 10.0% or more, 15.0% or more, or 20.0% or more. The Fe concentration may be 30.0% or less or 28.0% or less.

Si: 0 to 2.0%

Si is an optional additive element and may be 0%. However, by including Si, a $Mg_2Si$ phase, an Al—Ca—Si—Zn phase, a Mg—Al—Si—Zn phase, and the like are formed in the plated layer. Thereby, the corrosion resistance of the plated layer can be improved. Therefore, the Si concentration may be more than 0%, 0.1% or more, or 0.2% or more. On the other hand, when the Si concentration is excessive, base metal corrosion resistance and sacrificial corrosion resistance may be deteriorated. Therefore, the Si concentration is 2.0% or less. The Si concentration may be 0.8% or less or 0.6% or less.

Ca: 0 to 2.0%

Ca is an optional additive element and may be 0%. However, by including Ca, an Al—Ca—Zn phase, an Al—Ca—Si—Zn phase, a Ca—Zn phase, and the like are formed in the plated layer. Thereby, the corrosion resistance of the plated layer can be improved. In addition, Ca is an element capable of adjusting the optimum Mg elution amount to obtain base metal corrosion resistance. Therefore, the Ca concentration may be 0.05% or more or 0.1% or more. On the other hand, when the Ca concentration is excessive, base metal corrosion resistance and workability may be deteriorated. Therefore, the Ca concentration is 2.0% or less. The Ca concentration may be 1.0% or less.

Further, the plated layer according to the embodiment may include one or more selected from a group consisting of following group A and group B.

[Group A] 0 to 1.0% of Ni

[Group B] 0 to 5% in total of one or more of 0 to 0.5% of Sb, 0 to 0.5% of Pb, 0 to 1.0% of Cu, 0 to 2.0% of Sn, 0 to 1.0% of Ti, 0 to 1.0% of Cr, 0 to 1.0% of Nb, 0 to 1.0% of Zr, 0 to 1.0% of Mn, 0 to 1.0% of Mo, 0 to 1.0% of Ag, 0 to 1.0% of Li, 0 to 0.5% of La, 0 to 0.5% of Ce, 0 to 0.5% of B, 0 to 0.5% of Y, 0 to 0.5% of P, 0 to 0.5% of Sr, 0 to 0.5% of Co, 0 to 0.5% of Bi, 0 to 0.5% of In, 0 to 0.5% of V, and 0 to 0.5% of W.

Ni: 0 to 1.0%

The Ni concentration as Group A may be 0%. Ni contributes to improvement in sacrificial corrosion resistance.

Therefore, the Ni concentration may be 0.001% or more. On the other hand, when the Ni concentration is excessive, base metal corrosion resistance may be deteriorated. Therefore, the Ni concentration is 1.0% or less. The Ni concentration may be 0.8% or less, 0.6% or less, or 0.5% or less, 0.1% or less, or 0.01% or less.

The plated layer according to the embodiment may include 0 to 5% in total of one or more of the elements in Group B. When the total amount of the elements in Group B exceeds 5%, base metal corrosion resistance or sacrificial corrosion resistance may be deteriorated. Hereinafter, the elements in Group B will be described.

Sb, Pb: 0 to 0.5% Each

The concentration of Sb and Pb may be 0%. Sb and Pb contribute to improvement in sacrificial corrosion resistance. Therefore, the concentration of each of Sb and Pb may be 0.001% or more, 0.005% or more, or 0.01% or more. On the other hand, when the concentration of each of Sb and Pb is excessive, base metal corrosion resistance may be deteriorated. Therefore, the concentration of each of Sb and Pb is 0.5% or less. The concentration of each of Sb and Pb may be 0.3% or less, 0.1% or less, or 0.05% or less.

Cu, Ti, Cr, Nb, Zr, Mn, Mo, Ag, and Li: 0 to 1.0% Each

The concentration of each of Cu, Ti, Cr, Nb, Zr, Mn, Mo, Ag, and Li may be 0%. These elements contribute to improvement in sacrificial corrosion resistance. Therefore, the concentration of each of Cu, Ti, Cr, Nb, Zr, Mn, Mo, Ag, and Li may be 0.005% or more or 0.01% or more. On the other hand, when the concentration of each of Cu, Ti, Cr, Nb, Zr, Mn, Mo, Ag, and Li is excessive, base metal corrosion resistance may be deteriorated. Therefore, the concentration of each of Cu, Ti, Cr, Nb, Zr, Mn, Mo, Ag, and Li is 1.0% or less. The concentration of each of Cu, Ti, Cr, Nb, Zr, Mn, Mo, Ag, and Li may be 0.5% or less, 0.1% or less, or 0.05% or less.

Sn: 0 to 2.0%

The Sn concentration may be 0%. Sn is an element which forms an intermetallic compound with Mg, and improves the sacrificial corrosion resistance of the plated layer. Therefore, the Sn concentration may be 0.01% or more, 0.02% or more, or 0.05% or more. However, when the Sn concentration is excessive, base metal corrosion resistance may be deteriorated. Therefore, the Sn concentration is 2.0% or less. The Sn concentration may be 1.5% or less, 1.0% or less, 0.5% or less, or 0.2% or less. In order to include a $Mg_2Sn$ phase, the Sn concentration is preferably 0.02 to 2.0%.

La, Ce, B, Y, P, and Sr: 0 to 0.5% Each

The concentration of each of La, Ce, B, Y, P, and Sr may be 0%. La, Ce, B, Y, P, and Sr contribute to improvement in sacrificial corrosion resistance. Therefore, the concentration of each of La, Ce, B, Y, P, and Sr may be 0.005% or more or 0.01% or more, respectively. On the other hand, when the concentration of each of La, Ce, B, Y, P, and Sr is excessive, base metal corrosion resistance may be deteriorated. Therefore, the concentration of each of La, Ce, B, Y, P, and Sr is 0.5% or less. The concentration of each of La, Ce, B, Y, P, and Sr may be 0.2% or less, 0.1% or less, 0.05% or less, or 0.02% or less, respectively.

Co, Bi, In, V, and W: 0 to 0.5% Each

The concentration of each of Co, Bi, In, V, and W may be 0%. Co, Bi, In, V, and W contribute to improvement in sacrificial corrosion resistance. Therefore, the concentration of each of Co, Bi, In, V, and W may be 0.001% or more, 0.002% or more, or 0.004% or more, respectively. On the other hand, when the concentration of each of Co, Bi, In, V, and W is excessive, base metal corrosion resistance may be deteriorated. Therefore, the concentration of each of Co, Bi, In, V, and W is 0.5% or less. The concentration of each of Co, Bi, In, V, and W may be 0.1% or less, 0.05% or less, 0.02% or less, or 0.01% or less, respectively.

Balance: Zn and Impurities

The balance in the composition of the plated layer according to the embodiment includes Zn and impurities. Zn is an element which enhances base metal corrosion resistance and sacrificial corrosion resistance to the plated layer. The Zn concentration is not particularly limited, but may be 15.0% or more, 30.0% or more, or 50.0% or more. The impurities are derived from the elements which are contaminated from raw materials and from production processes. For instance, in the plated layer, a small amount of elements other than Fe may be included as the impurities due to mutual atomic diffusion between the base steel material and the plating bath.

The chemical composition of the plated layer is measured by the following method. First, an acid solution in which the plated layer is exfoliated and dissolved is obtained using an acid including an inhibitor, which suppresses corrosion of the base steel material, to perform immersion at room temperature for 20 minutes. Next, the obtained acid solution is quantitatively analyzed by ICP emission spectrometry. Thereby, the chemical composition of the plated layer can be determined. As the acid including an inhibitor, for instance, a 10% hydrochloric acid solution to which 0.06 mass % of an inhibitor (IBIT 710 K, manufactured by Asahi Chemical Co., Ltd.) is added can be used. The chemical composition measured by the above-described method is the chemical composition of the entire plated layer.

Next, the plated layer according to the embodiment will be described in more detail. In the plated steel material according to the embodiment, the interface between the plated layer and the base steel material is an uneven surface. Since the interface between the plated layer and the base steel material is an uneven surface, adhesion of the plated layer is greatly improved.

Figure 2:
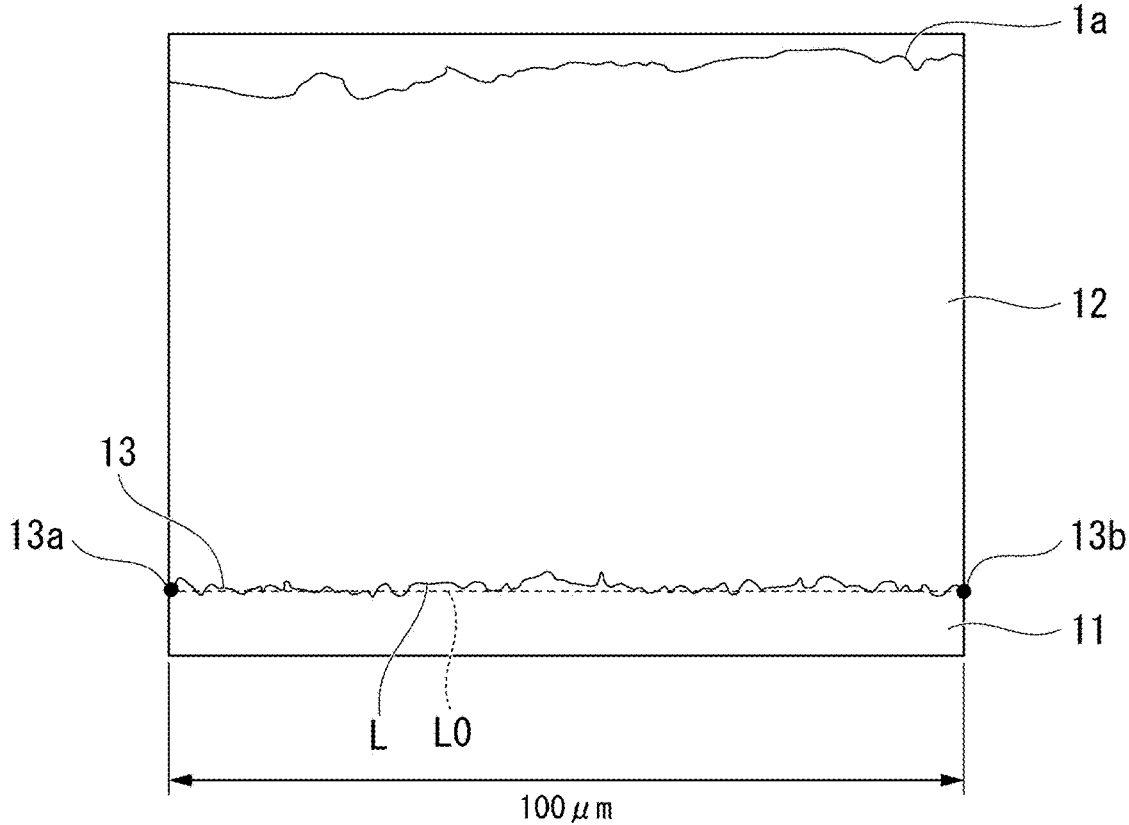
FIG. 2 is a schematic cross-sectional illustration showing a plated steel material according to an embodiment of the present invention, and is an illustration showing an observation region.

Whether or not the interface between the plated layer and the base steel material is such an uneven surface that adhesion of the plated layer is improved can be confirmed by whether or not when observing an observation region which is a cross section of the plated steel material having a predetermined length, for instance 100 μm, in a direction parallel to the surface $1a$ of the plated steel material in a cross section perpendicular to the surface as shown in FIG. 2, the length L of the boundary line 13 between the plated layer 12 and the base steel material 11 satisfies a following formula (1). In FIG. 2, a cross section having more than 100 μm in a direction parallel to the surface $1a$ of the plated steel material is observed, but the length of the cross section is not limited to 100 μm, and may be any length (predetermined length). Specifically, in a cross section perpendicular to the surface $1a$ of the plated steel material, a cross section of the plated steel material having a length of 100 μm in a direction parallel to the surface $1a$ is set as an observation region.

Then, the linear distance $L_0$ between one end 13a and another end 13b of the boundary line 13 in the observation region and the length L of the boundary line 13 between one end 13a and the other end 13b are obtained, and the value of $((L-L_0)/L_0 \times 100)$ is calculated. As shown in the formula (1), when $(L-L_0)/L_0 \times 100$ is 2.0% or more, adhesion of the plated layer is improved. The plated steel material according to the embodiment may satisfy the following formula (2) or the following formula (3) instead of the following formula (1). Although the upper limit of $(L-L_0)/L_0 \times 100$ is not particularly necessary, an excessively large value thereof deteriorates the surface smoothness of the plated layer. Therefore, the upper limit may be 40.0% or less, 10.0% or less, or 9.0% or less.

$$(L-L_0)/L_0 \times 100 \geq 2.0(\%) \tag{1}$$

$$(L-L_0)/L_0 \times 100 \geq 4.0(\%) \tag{2}$$

$$(L-L_0)/L_0 \times 100 \geq 6.0(\%) \tag{3}$$

The observation region is a cross section of the plated steel material having a predetermined length in a direction parallel to the surface $1a$ of the plated steel material when observed with a SEM ("JSM-7000F", manufactured by JEOL Ltd., acceleration voltage: 15 kV) at a magnification of 1000 times or more. When the predetermined length is 100 μm, the resolution of the observation region is 2560 pixels or more in width and 1920 pixels or more in height.

As shown in FIG. 2, when the surface $1a$ of the plated steel material is not flat in a microscopic region (region of about 100 μm) in the observation region, a direction parallel to the surface in a wider region (for instance, region of several mm² or more) of the plated steel material (for instance, a direction in which the sheet surface of a flat sheet extends when the flat sheet is placed) can be a direction in which the surface $1a$ extends. The "cross section perpendicular to the surface $1a$" and the "direction parallel to the surface $1a$" can be specified based on the direction.

Further, as shown in FIG. 2, each of one end 13a and another end 13b of the boundary line 13 is an intersection between the boundary line 13 and the straight line defining the observation region. $L_0$ is the length of a straight line connecting one end 13a and the other end 13b with each other. L is the length of the boundary line 13 from one end 13a to the other end 13b. The length L of the boundary line 13 can be measured, for instance, by Image J, which is image processing software in the public domain. An image observed with a SEM at a magnification of 1000 times or more is defined as image data with resolution higher than the above. The length of the boundary line 13 is measured using the measurement function of Image J for the image data.

Next, the microstructure of the plated layer will be described.

The fraction of the phases and microstructures included in the plated layer according to the embodiment has an influence on the red rust resistance, base metal corrosion resistance, and sacrificial corrosion resistance of the plated steel material. Even if the plated layers have the same composition, phases or microstructures included in the metallographic structure change depending on the producing method, and the properties thereof differ from each other. The metallographic structure of the plated layer can be easily confirmed by mirror-finishing a cross section perpendicular to the surface of the plated steel material, and analyzing the cross section with an electron beam probe microanalyzer equipped with a scanning electron microscope (SEM-EPMA, EPMA measurement device: JXA-8230, manufactured by JEOL Ltd., acceleration voltage: 15 kV, current: 0.05 $\mu$A, irradiation time: 50 ms). The thickness of the plated layer according to the embodiment is about 10 to 300 $\mu$m. In the SEM, the magnification is set to be 200 to 5000 times, and the cross section of the plated layer is observed in the region of 36000 $\mu$m$^2$. In the embodiment, there is a possibility that a local visual field of the plated layer is observed in the visual field of the SEM. Therefore, in order to obtain average information of the plated layer, 25 visual fields are selected from the cross section for the average information. That is, the area fraction of the phases or microstructures constituting the metallographic structure of the plated layer is determined by observing the metallographic structure in a visual field of 25×36000 $\mu$m$^2$ in total. If necessary, the measurement may be performed on a plurality of cross sections. The cross section is preferably in the vicinity of the center of the flat area of the measurement target (sample).

For confirmation of each phase, in element analysis by EPMA, the composition of the phase is confirmed by point analysis, phases having equivalent composition are confirmed from element mapping, and each phase is identified. In the point analysis, lattice points of 250 pixels×250 pixels are analyzed for each element of Al, Zn, Mg, Fe, and Si in the EPMA analysis result. The electron beam diameter is 1 $\mu$m or less. The phases having equivalent composition can be discriminated by identifying phases having substantially the same composition through element mapping. That is, for confirmation of each phase, for the region other than the [Binary eutectic structure of Al/MgZn$_2$] showing a lamellar structure, the composition of the phase is confirmed by point analysis in SEM-EPMA analysis, phases having substantially the same composition are confirmed from element mapping or the like, and the phase is identified. The area of each phase is measured using image analysis software "Image J (Ver. 1.54f)". The ratio of the total area of each phase to the area of the entire observed visual field is defined as the area fraction (%) of each phase.

The area percentage (area fraction) of each phase in the observed visual field corresponds to the volume fraction of the phase in the first region, the second region, or the third region.

As described above, the plated layer according to the embodiment includes the first region where the Fe concentration is less than 5.0 mass %, the second region where the Fe concentration is 5.0 mass % or more and less than 30.0 mass %, and the third region where the Fe concentration is 30.0 mass % or more and 80.0 mass % or less. Hereinafter, the phase and microstructure included in one or more of the first region, the second region, and the third region will be described.

Al-Containing Phase

The Al-containing phase according to the embodiment is a phase including Zn and 20 to 99 mass % of Al. The Zn concentration in the Al-containing phase may be 1 to 80 mass %. In addition, the Al-containing phase may include 5 mass % or less in total of other elements. Here, the other elements are Mg, Si, and the like. The Al-containing phase may have a form in which Zn is solid-solved in Al, or may be an aggregate of a fine Zn phase having a particle size of less than 1 $\mu$m and a fine Al phase having a particle size of less than 1 $\mu$m. The Al-containing phase can be clearly distinguished from other phases and microstructures when the phase including Zn and 20 to 99 mass % of Al is identified by EPMA element mapping.

The Al-containing phase may be included in the first region. However, a plated layer including a large amount of the Al-containing phase in the first region has reduced corrosion resistance after coating, and therefore it is desirable that the Al-containing phase is not included in the first region as much as possible.

Mg—Zn Phase

The Mg—Zn phase is a phase including Zn and 20 to 60 mass % of Mg. The Zn concentration in the Mg—Zn phase may be 40 to 80 mass %. In addition, the Mg—Zn phase may include 5 mass % or less in total of other elements. Here, the other elements are Mg, Si, and the like. Specific instances of the Mg—Zn phase include an MgZn$_2$ phase and an Mg$_2$Zn$_{11}$ phase. The Mg—Zn phase can be clearly distinguished from the Al-containing phase, [Binary eutectic structure of Zn/MgZn$_2$], and the like when the phase including Zn and 20 to 60 mass % of Mg is identified by EPMA element mapping.

The Mg—Zn phase is included in the first region. The Mg—Zn phase may be included in the second region and the third region. When the Mg—Zn phase is included in the plated layer, red rust resistance and base metal corrosion resistance are improved, and sacrificial corrosion resistance is further improved.

Binary Eutectic Structure of Zn/MgZn$_2$

The [Binary eutectic structure of Zn/MgZn$_2$] is a eutectic structure consisting of an $\eta$-Zn phase and an MgZn$_2$ phase. The [Binary eutectic structure of Zn/MgZn$_2$] showing a lamellar structure consisting of an $\eta$-Zn phase and an MgZn$_2$ phase is clearly distinguished from the Al-containing phase, the Mg—Zn phase, the Zn phase, and the Fe—Al phase in a SEM reflected electron image. The identification of microstructures other than the [Binary eutectic structure of Zn/MgZn$_2$] such as the Al phase and the Mg—Zn phase described above may be performed for the remaining area, except for the [Binary eutectic structure of Zn/MgZn$_2$] showing a lamellar structure.

The [Binary eutectic structure of Zn/MgZn$_2$] may be included in the first region or the second region. When the [Binary eutectic structure of Zn/MgZn$_2$] is present to some extent, corrosion resistance after coating can be improved.

Fe—Al Alloy Phase

The Fe—Al alloy phase is a phase including Al and 20 to 60 mass % of Fe. The Al concentration in the Fe—Al alloy phase may be 40 to 80 mass %. In addition, the Fe—Al alloy phase may include 5 mass % or less in total of other elements. Here, the other elements are Si and the like. The Fe—Al alloy phase is a phase mainly composed of Al$_5$Fe. In addition to Al$_5$Fe, the Fe—Al alloy phase may include AlFe, Al$_3$Fe, Al$_5$Fe$_2$, or the like. The Fe—Al alloy phase may be an Fe—Al—Si compound phase when Si is included in the plated layer. Instances of the Fe—Al—Si compound phase to be identified include an AlFeSi phase, and include $\alpha$, $\beta$, q1, q2-AlFeSi phases and the like as isomers.

The Fe—Al alloy phase is mainly included in the second region and the third region. The Fe—Al alloy phase has corrosion resistance for Fe to a certain extent. The Fe—Al alloy phase is an intermetallic compound phase, and therefore shows insulation and corrosion resistance.

The plated layer may include other intermetallic compounds as the balance. Instances of other intermetallic compounds include a $Mg_2Si$ phase, a $Mg_2Sn$ phase, a Zn phase, an Al—Ca—Zn phase, an Al—Ca—Si—Zn phase, a Ca—Zn phase, and a Mg—Al—Si—Zn phase.

$Mg_2Si$ Phase

When Si is included in the plated layer, Si may be precipitated as a $Mg_2Si$ phase. The $Mg_2Si$ phase is excellent in corrosion resistance. The presence of $Mg_2Si$ can be measured by SEM/EPMA described later. A phase satisfying 50 to 70 at % of Mg and 30 to 50 at % of Si can be determined as the $Mg_2Si$ phase.

$Mg_2Sn$ Phase

The $Mg_2Sn$ phase included in the plated layer further improves the corrosion resistance after coating and the base metal corrosion resistance of the plated steel material. Since the amount of the $Mg_2Sn$ phase is small, the presence thereof is confirmed by X-ray diffraction measurement. In order to include the $Mg_2Sn$ phase, Sn is preferably Sn: 0.02 to 2.0% in the chemical composition of the plated layer. The presence of the $Mg_2Sn$ phase is measured by X-ray diffraction measurement using Cu-Kα ray under conditions of an X-ray output of 50 kV and 300 mA. The measurement range is 2θ=10 to 30°, and the scanning step is 0.02° step. When a diffraction peak is detected at 23.4±0.3°, it is determined that the $Mg_2Sn$ phase is present.

Zn Phase

The Zn phase includes more than 80 mass % of Zn, may include less than 20 mass % of Al, and may include 5 mass % or less in total of other elements such as Si and Mg. The Zn phase may be included in the first region or the second region. The included Zn phase further improves sacrificial corrosion resistance. Since the Zn phase is photographed white in a reflected electron image of the SEM, the Zn phase can be clearly distinguished from other phases and microstructures.

Al—Ca—Zn Phase, Al—Ca—Si—Zn Phase, Ca—Zn Phase, and Mg—Al—Si—Zn Phase

When Ca or Si is included in the plating bath, these intermetallic compound phases may be precipitated in the plated layer. These intermetallic compound phases are more excellent in corrosion resistance than the $Mg_2Si$ phase described above. The presence of these intermetallic compound phases can be confirmed by X-ray diffraction measurement in addition to SEM and EPMA measurement. The conditions of X-ray diffraction may be the same as for the $Mg_2Sn$ phase.

As described above, the plated layer according to the embodiment includes the first region where the Fe concentration is less than 5.0 mass %, the second region where the Fe concentration is 5.0 mass % or more and less than 30.0 mass %, and the third region where the Fe concentration is 30.0 mass % or more and 80.0 mass % or less. The boundaries of the first region, the second region, and the third region are determined as follows.

First, a cross section perpendicular to the surface of the plated steel material is exposed. The exposed cross section is mirror-finished. The Fe concentration is measured by point analysis using an electron beam probe microanalyzer (EPMA). As an analysis result by EPMA, the analysis result used to identify each phase in the plated layer described above can be utilized.

Figure 3:
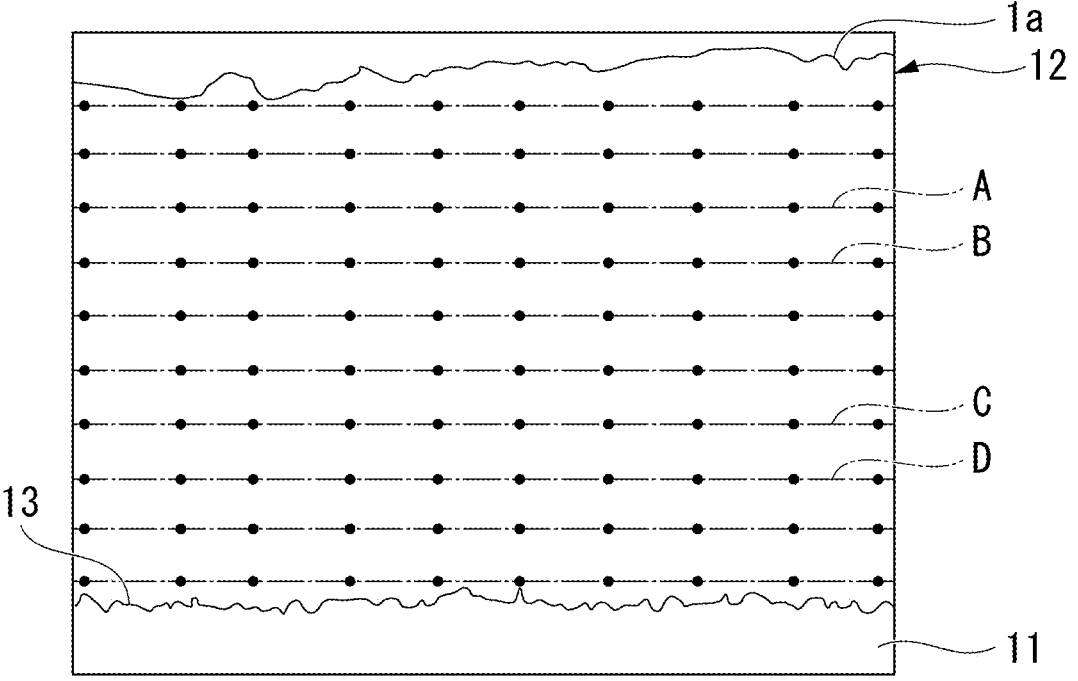
FIG. 3 is a schematic cross-sectional illustration showing a plated steel material according to an embodiment of the present invention, and is an illustration to explain a method for determining the area of a first region and a second region.

First, as the first stage measurement, as shown in FIG. 3, a plurality of linear analysis lines parallel to a direction orthogonal to the thickness direction of the plated layer 12 are set in the cross section of the plated layer 12. Ten analysis lines are set at equal intervals in the thickness direction of the plated layer. When the thickness of the plated layer exceeds 100 μm, the interval between the analysis lines is set to be 10 μm. On the analysis line, 10 measurement points are set at intervals of 10 μm in a direction orthogonal to the thickness direction. When the length of the analysis line is less than 90 μm and 10 measurement points cannot be set at 10 μm intervals, the interval may be appropriately narrowed or the number of measurement points may be appropriately reduced. In FIG. 3, the alternate long and short dash line is the analysis line, and the black dot on the analysis line is a measurement point. When the analysis line is set such that the number of analysis lines is maximized in the cross section of the plated layer 12 and the thickness of the plated layer 12 is 10 μm or less, the first stage measurement is omitted, and the following second stage measurement is performed.

At each measurement point, the Fe concentration (mass %) in the plated layer is measured by point analysis. The output of the electron beam for point analysis is 15 kV and $4\times10^{-7}$ A, and the spot diameter of the tip of the electron beam is 0.2 μm. For each analysis line, the average value of the Fe concentration at 10 measurement points is obtained, and the average value is defined as the Fe concentration in each analysis line. Then, the analysis line A where the Fe concentration is less than 5.0% and the Fe concentration is closest to 5.0% and the analysis line B where the Fe concentration is more than 5.0% and the Fe concentration is closest to 5.0% are specified. Further, the analysis line C where the Fe concentration is less than 30.0% and the Fe concentration is closest to 30.0% and the analysis line D where the Fe concentration is more than 30.0% and the Fe concentration is closest to 30.0% are specified.

Figure 4:
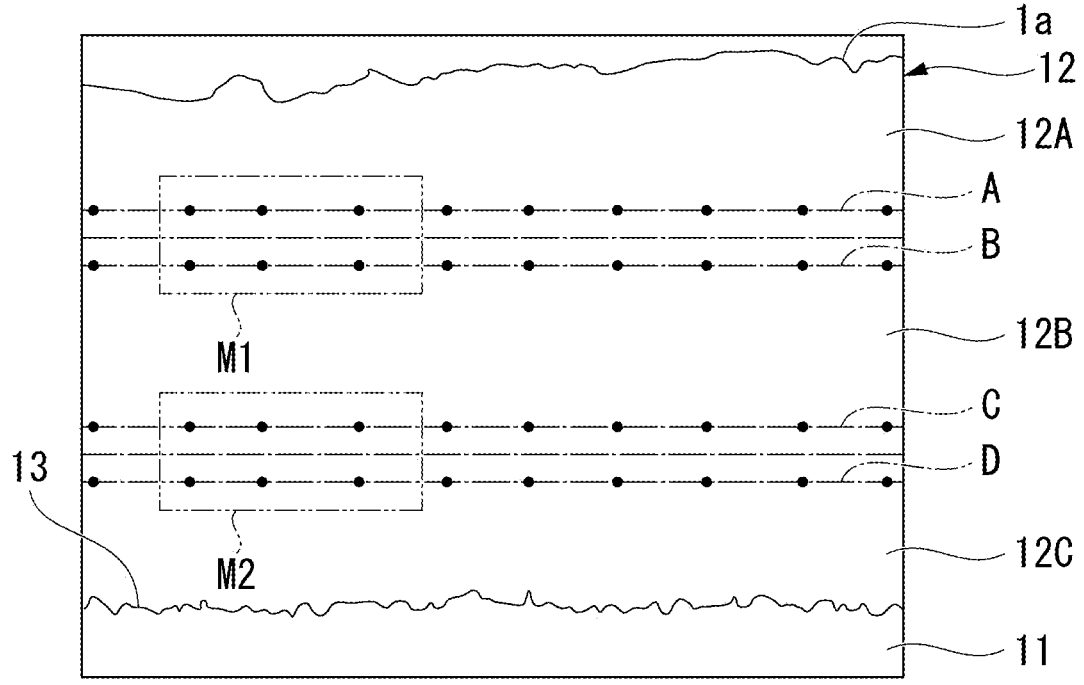
FIG. 4 is a schematic cross-sectional illustration showing a plated steel material according to an embodiment of the present invention, and is an illustration to explain a method for determining the area of a first region and a second region.
Figure 5:
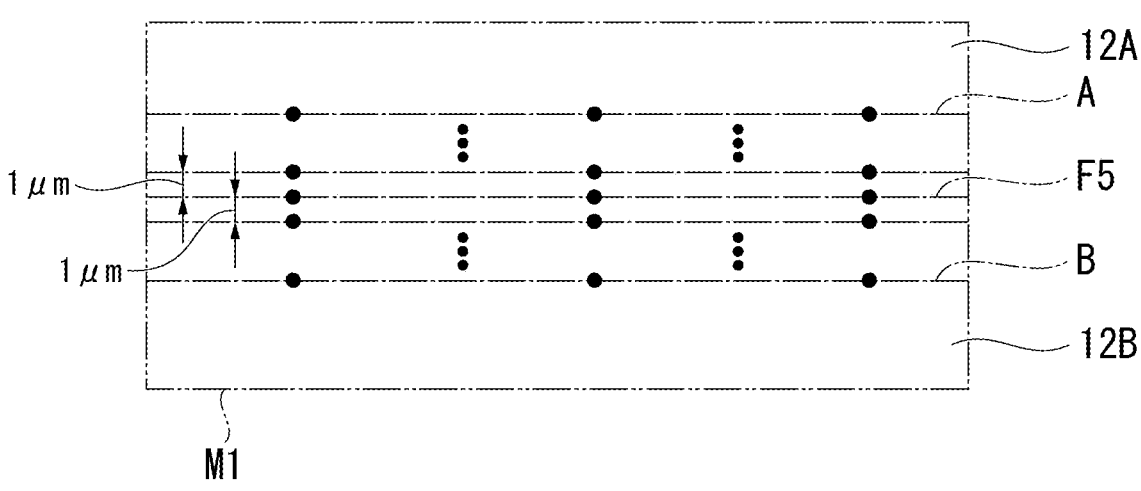
FIG. 5 is a schematic cross-sectional illustration showing a plated steel material according to an embodiment of the present invention, and is an enlarged view of a region M1 in FIG. 4.
Figure 6:
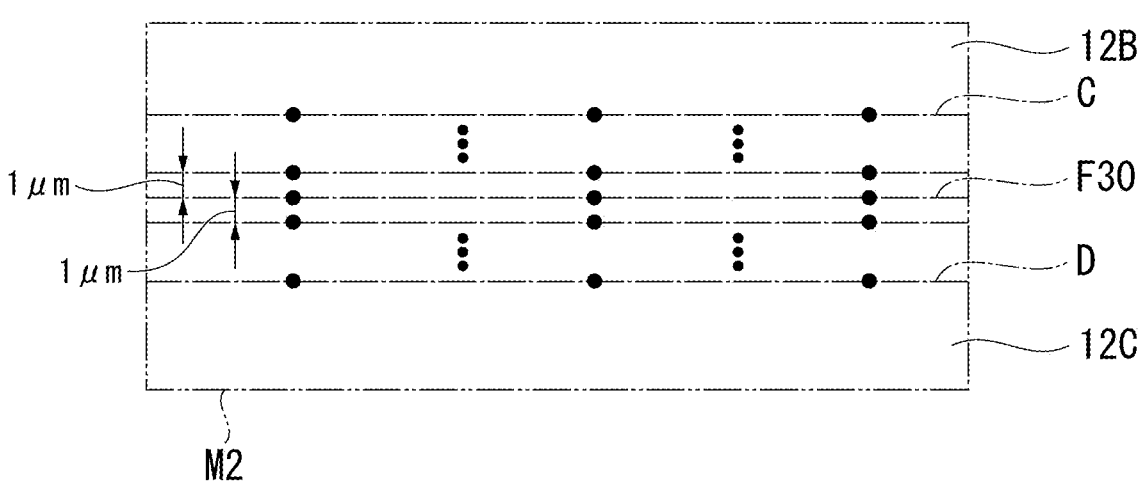
FIG. 6 is a schematic cross-sectional illustration showing a plated steel material according to an embodiment of the present invention, and is an enlarged view of a region M2 in FIG. 4.

Next, as the second stage measurement, as shown in FIGS. 4 and 5, the Fe concentration is analyzed in the area between the analysis line A and the analysis line B in the cross section of the plated layer 12. As shown in FIGS. 4 and 6, the Fe concentration is also analyzed in the area between the analysis line C and the analysis line D. FIG. 4 is an illustration showing the analysis lines A, B, C, and D among a plurality of analysis lines. FIG. 5 is an enlarged view of the region M1 between the analysis line A and the analysis line B in FIG. 4. FIG. 6 is an enlarged view of the region M2 between the analysis line C and the analysis line D in FIG. 4.

In the second stage measurement, as shown in FIGS. 4 to 6, a plurality of analysis lines are set at intervals of 1 μm in the thickness direction of the plated layer in each of the area between the analysis line A and the analysis line B and the area between the analysis line C and the analysis line D. Ten measurement points are set at intervals of 10 μm on the analysis line. FIGS. 4 and 5 illustrate, as an instance, some analysis lines provided between the analysis line A and the analysis line B. FIGS. 4 and 6 illustrate some analysis lines provided between the analysis line C and the analysis line D. Then, at each measurement point, the Fe concentration (mass %) is measured by point analysis. The output of the electron beam and the spot diameter of the tip of the electron beam for point analysis are as in the first stage measurement.

For each analysis line, the average value of the Fe concentration at 10 measurement points is obtained, and the average value is defined as the Fe concentration in each analysis line. Then, the analysis line where the Fe concentration is closest to 5.0% is specified as the "analysis line where the Fe concentration is 5.0%" (For instance, the analysis line F5 in FIG. 5). Then, the analysis line where the Fe concentration is closest to 30.0% is specified as the "analysis line where the Fe concentration is 5.0%" (For instance, the analysis line F30 in FIG. 6). The analysis line F5 where the Fe concentration is 5.0 mass % is defined as the boundary line, and the area closer to the surface 1a side (analysis line A side) of the plated steel material than the analysis line F5 is defined as the first region 12A. The analysis line F30 where the Fe concentration is 30.0 mass % is defined as the boundary line, and the area closer to the base steel material than the analysis line F30 is defined as the third region 12C. Further, the area between the analysis line F5 and the analysis line F30 is defined as the second region 12B.

That is, as shown in FIGS. 4 to 6, the first region 12A is the area between the surface 1a of the plated steel material and the analysis line F5 where the Fe concentration is 5.0 mass %. The second region 12B is the area between the analysis line F5 where the Fe concentration is 5.0 mass % and the analysis line F30 where the Fe concentration is 30.0 mass %. The third region 12C is the area between the analysis line F30 where the Fe concentration is 30.0 mass % and the interface 13 between the plated layer 12 and the base steel material 11. The first region 12A, the second region 12B, and the third region 12C are formed in layers over the entire plated layer 12. In the plated layer 12, the first region 12A is arranged closer to the surface 1a side of the plated steel material 1 than the second region 12B. In the plated layer 12, the second region 12B is arranged between the first region 12A and the third region 12C. In the plated layer 12, the third region 12C is arranged closer to the base steel material 11 side than the second region 12B and adjacent to the base steel material 11.

First Region

The first region is a region which is arranged at the surface of the plated steel material and where the Fe concentration is less than 5.0 mass %. The upper surface of the first region constitutes the surface of the plated steel material. The presence of the first region improves the red rust resistance, the base metal corrosion resistance, and the sacrificial corrosion resistance of the plated steel material. The presence of the first region having a low area fraction of the Al-containing phase improves corrosion resistance after coating.

The first region may include the Al-containing phase of less than 5% in an area fraction. The area fraction of the Al-containing phase is preferably less than 1%, and more preferably 0%. Since the corrosion resistance after coating deteriorates as an amount of the Al-containing phase increases, the first region preferably includes no Al-containing phase. If included, the amount is preferably less than 5% at the maximum. When the area fraction of the Al-containing phase is 5% or more in the first region, corrosion resistance after coating is deteriorated.

The first region may include the Mg—Zn phase of 2% or more in an area fraction. The Mg—Zn phase is excellent in corrosion resistance after coating and sacrificial corrosion resistance as compared with the Al-containing phase. Therefore, in order to improve the corrosion resistance after coating and the sacrificial corrosion resistance of the plated steel material, the first region preferably includes 2% or more of the Mg—Zn phase. The area fraction of the Mg—Zn phase in the first region is preferably 5% or more, 10% or more, 15% or more, 20% or more, 30% or more, or 40% or more. The upper limit of the Mg—Zn phase in the first region is not particularly limited, but is preferably 95% or less, and may be 90% or less, for instance.

The first region may include the [Binary eutectic structure of $Zn/MgZn_2$] of 1% or more in an area fraction. When the [Binary eutectic structure of $Zn/MgZn_2$] is included in the first region, the corrosion resistance after coating and the sacrificial corrosion resistance of the plated steel material is further enhanced. The area fraction of the [Binary eutectic structure of $Zn/MgZn_2$] in the first region is preferably 3% or more, 5% or more, or 10% or more. The upper limit of the [Binary eutectic structure of $Zn/MgZn_2$] in the first region is not particularly limited, but is, for instance, preferably 90% or less, and may be 80% or less, 60% or less, 50% or less, or 40% or less.

The first region may include, as the balance, a Zn phase, a $Mg_2Si$ phase, a $Mg_2Sn$ phase, an Al—Ca—Zn phase, an Al—Ca—Si—Zn phase, a Ca—Zn phase, a Mg—Al—Si—Zn phase, and the like. Further, the first region may include the Fe—Al alloy phase of 3% or less in an area fraction.

The thickness of the first region is 5 to 100 μm. When the thickness of the first region is 5 μm or more, corrosion resistance after coating, red rust resistance, base metal corrosion resistance, and sacrificial corrosion resistance are improved. On the other hand, since the first region having a thickness of more than 100 μm may be difficult to produce, the upper limit is 100 μm or less. The thickness of the first region may be 70 μm or less, 50 μm or less, or 40 μm or less. The thickness of the first region may be 10 μm or more, or 15 μm or more. The thickness of the first region is an average thickness. The average thickness is an arithmetic average value obtained by measuring the distance in the thickness direction of the plated layer from the surface of the plated layer to the analysis line F5 where the Fe concentration is 5.0% at 10 points with an interval of 10 μm or more in an image obtained by the above-described SEM observation.

Second Region

The second region is a region which is arranged between the first region and the third region and includes 5.0 mass % or more and less than 30.0 mass % of Fe. The second region includes less than 30.0 mass % of Fe, and further includes Zn, Al, and Mg. Therefore, the second region may include an Fe—Al alloy phase or an Mg—Zn phase. The second region preferably includes a large amount of Mg—Zn phase than the Fe—Al alloy phase. The second region may include a large amount of the Fe—Al alloy phase than the Mg—Zn phase. The difference in the content between the two phases is preferably 12% or less, preferably 10% or less, and more preferably 5% or less in terms of area fraction. The Mg—Zn phase improves red rust resistance, base metal corrosion resistance, and sacrificial corrosion resistance. The Fe—Al alloy phase improves base metal corrosion resistance.

By the presence of the above second region in the plated layer, base metal corrosion resistance and red rust resistance are improved. The effect of improving base metal corrosion resistance and red rust resistance by the second region is obtained in the late stage of corrosion.

The second region may include the [Binary eutectic structure of $Zn/MgZn_2$]. This improves corrosion resistance after coating.

The shape of the Fe—Al alloy phase which can be included in the second region is preferably a needle-like shape having an equivalent circle diameter of 15 μm or less and an aspect ratio of 2 or more when the cross section of the second region is observed. The Fe—Al alloy phase contributes to improvement in base metal corrosion resistance through barrier effect. On the other hand, the Fe—Al alloy phase tends to be a starting point of red rust occurrence during corrosion. However, since the Fe—Al alloy phase included in the second region has a needle-like shape, the occurrence of red rust is relatively suppressed.

The shape of the Fe—Al alloy phase which can be included in the second region may be determined by identifying a needle-like Fe—Al alloy phase having an equivalent circle diameter of 15 μm or less and an aspect ratio of 2 or more when the fraction of the phases and microstructures included in the plated layer according to the embodiment is confirmed with an electron beam probe microanalyzer (SEM-EPMA).

The area fraction of the Fe—Al alloy phase in the second region may be 5% or more. Accordingly, base metal corrosion resistance is further improved. The area fraction of the Fe—Al alloy phase in the second region may be 10% or more, 20% or more, or 30% or more. The upper limit of the Fe—Al alloy phase in the second region is not particularly limited, but is preferably, for instance, 80% or less, 70% or less, or 60% or less.

The area fraction of the Mg—Zn phase in the second region may be 5% or more. As a result, sacrificial corrosion resistance is further improved, in addition to base metal corrosion resistance and red rust resistance. The Mg—Zn phase has excellent sacrificial corrosion resistance than the Fe—Al phase. Therefore, from the viewpoint of sacrificial corrosion resistance, the second region preferably includes a large amount of the Mg—Zn phase. The area fraction of the Mg—Zn phase in the second region may be 10% or more, 20% or more, 30% or more, or 40% or more.

The upper limit of the Mg—Zn phase in the second region is not particularly limited, but is preferably, for instance, 70% or less, 60% or 50% or less.

The area fraction of the [Binary eutectic structure of $Zn/MgZn_2$] in the second region may be 2% or more. As a result, the corrosion resistance after coating and the sacrificial corrosion resistance of the plated steel material are further enhanced. The area fraction of the [Binary eutectic structure of $Zn/MgZn_2$] in the second region may be 5% or more, 8% or more, or 10% or more. The upper limit of the [Binary eutectic structure of $Zn/MgZn_2$] in the second region is not particularly limited, but is, for instance, preferably 90% or less, and may be 80% or less, 50% or less, 30% or less, or 20% or less.

The second region may include, as the balance, an Al-containing phase, a $Mg_2Si$ phase, a $Mg_2Sn$ phase, a Zn phase, an Al—Ca—Zn phase, an Al—Ca—Si—Zn phase, a Ca—Zn phase, a Mg—Al—Si—Zn phase, and the like. The area fraction of the phases as the balance is preferably 10% or less in total.

The thickness of the second region is 5 to 100 μm. When the thickness of the second region is 5 μm or more, base metal corrosion resistance, sacrificial corrosion resistance, and red rust resistance are improved. The thickness is preferably 15 μm or more. On the other hand, since the second region having a thickness of more than 100 μm may be difficult to produce, the upper limit is 100 μm or less. The thickness of the second region may be 70 μm or less, 50 μm or less, 40 μm or less, or 30 μm or less. The thickness of the second region is an average thickness. The average thickness is an arithmetic average value obtained by measuring the distance in the thickness direction of the plated layer between the analysis line where the Fe concentration is 5.0% and the analysis line where the Fe concentration is 30.0% at 10 points with an interval of 10 μm or more in an image obtained by the above-described SEM observation.

Third Region

The third region is a region which is arranged between the second region and the base steel material and where 30.0 mass % or more and 80.0 mass % or less of Fe is included. Since Fe is included in the range of 30.0 mass % or more and 80.0 mass % or less in the third region, a large amount of the Fe—Al alloy phase is included. Among the phases or microstructures included in the third region, the Fe—Al alloy phase occupies the maximum area fraction. The third region may include the Mg—Zn phase in an amount substantially equal to that of the Fe—Al alloy layer. By the presence of the third region where Fe is 30 mass % or more in the plated layer, the base metal corrosion resistance of the plated layer is improved. The improvement in base metal corrosion resistance is presumably because the third region includes 30.0 mass % or more of Fe so that a large amount of the Fe—Al alloy phase is included and the Fe—Al alloy phase functions as a barrier layer of the base steel material.

As described above, the third region may include the Mg—Zn phase in addition to the Fe—Al alloy phase. The area fraction of the Mg—Zn phase in the third region may be 10% or more, 15% or more, 20% or more, or 30% or more. This further improves sacrificial corrosion resistance. The Mg—Zn phase has excellent sacrificial corrosion resistance than the Fe—Al phase. Therefore, from the viewpoint of sacrificial corrosion resistance, the third region preferably includes a large amount of the Mg—Zn phase. The upper limit of the $MgZn_2$ phase in the third region is not particularly limited, but is preferably 50% or less, for instance.

The third region may include, as the balance, an Al-containing phase, a $Mg_2Si$ phase, a $Mg_2Sn$ phase, a Zn phase, an Al—Ca—Zn phase, an Al—Ca—Si—Zn phase, a Ca—Zn phase, a Mg—Al—Si—Zn phase, and the like. The area fraction of the phases as the balance is preferably 10% or less in total.

The thickness of the third region is 5 to 100 μm. When the thickness of the third region is 5 μm or more, base metal corrosion resistance is improved. On the other hand, since the third region having a thickness of more than 100 μm may be difficult to produce, the upper limit is 100 μm or less. The thickness of the third region may be 70 μm or less, 50 μm or less, 40 μm or less, or 30 μm or less. The thickness of the third region may be more than 5 μm or 15 μm or more. The thickness of the third region is an average thickness. The average thickness is an arithmetic average value obtained by measuring the distance in the thickness direction of the plated layer between: the analysis line where the Fe concentration is 30.0%; and the boundary line between plated layer and the base steel material at 10 points with an interval of 10 μm or more in an image obtained by the above-described SEM observation.

The thickness of the plated layer is the total thickness of the first region, the second region, and the third region. That is, the thickness of the plated layer is preferably 15 to 300 μm.

In the plated steel material according to the embodiment, the base steel material and the third region are preferably in direct contact with each other. That is, it is preferable that there is no alloy layer other than the third region between the base steel material and the third region.

Next, the method for producing the plated steel material according to the embodiment will be described.

The method for producing the plated steel material according to the embodiment includes: a blasting process of subjecting the surface of the base steel material to shot blasting; a flux-applying process of applying a flux to the base steel material after the blasting process; a first plating process of dipping the base steel material after the flux-applying process in a first plating bath and then pulling up the base steel material; a second plating process of dipping the base steel material after the first plating process in a second plating bath and then pulling up the base steel material; and a cooling process of cooling the plated layer after the second plating process. As described above, the plated steel material according to the embodiment is produced by a so-called two-stage plating method.

The first plating bath in the first plating process is a plating bath including Zn, and the second plating bath in the second plating process is a plating bath including Al, Mg, and Zn. The plating method in the first plating process and the second plating process is a so-called dipping plating method.

In the blasting process, the surface of the base steel material is subjected to shot blasting. As a result, strain is applied to the surface of the base steel material. Hereinafter, conditions of the shot blasting will be described. Various shapes and materials are conceivable as the material of the shot material, but steel shot material conforming to JIS Z 0311:2004 is preferable, and particularly spherical shot material is preferable. The median particle diameter of the shot material is preferably in the range of 40 to 450 μm. The hardness is preferably Hv 390 to 510. Specifically, for instance, steel shot (TSH-30) manufactured by WINOA IKK JAPAN CO., LTD. can be used.

In the blasting process, the surface of the base steel material is impacted by the shot material using centrifugal force or air pressure according to Abrasive blast-cleaning methods for surface preparation (JIS Z 0310:2016) and the like. The shoot amount of the shot material is preferably in a range of 5 to 400 kg/m$^2$. The shoot amount of the shot material may be 10 kg/m$^2$ or more or 15 kg/m$^2$ or more. The shoot amount of the shot material may be 100 kg/m$^2$ or less or 50 kg/m$^2$ or less.

Strain is applied to the surface of the base steel material by the blasting process. When the first plating process and the second plating process, which are dipping plating method, are sequentially performed to the strained base steel material, the reaction between Fe from the base steel material or the Fe—Zn layer formed by the first plating process and Al from the plating bath becomes active to form a relatively large amount of the Fe—Al alloy phase during dipping the base steel material in the second plating bath. When strain is applied, the reaction rate between the base steel material and Zn has a distribution in the first plating process. Thereby, the interface between the plated layer and the base steel material easily becomes an uneven surface, and the plated steel material which satisfies the relationship of the formula (1) is obtained. This improves adhesion of the plated layer.

Next, in the flux-applying process, the base steel material is immersed in, for instance, a flux aqueous solution at 80° C. for 30 seconds, then pulled up, and dried in an air atmosphere at 150° C. The flux to be used is a solution including ZnCl$_2$ as a base, various salts such as NaCl, KCl, NaF, SnCl$_2$, SnCl$_4$, and BiCl$_3$, a surfactant, and the like, and being acidified with hydrochloric acid as necessary. When the flux is applied to the base steel material before plating, oxides on the surface of the base steel material is removed, and the plating reaction is stabilized. Instances of the flux include a flux in which 0 to 100 g/L of NaCl, 0 to 100 g/L of KCl, 0 to 20 g/L of SnCl$_2$, 100 to 300 g/L of ZnCl$_2$ are dissolved in water.

Next, in the first plating process, the plated steel material to which the flux has been applied is dipped in the first plating bath and then pulled up. The composition of the first plating bath is a plating bath mainly including Zn, a so-called zinc plating bath.

The base steel material is dipped in the first plating bath to form a zinc-plated layer. The Fe—Zn alloy layer is preferably formed on the base steel material side of the zinc-plated layer. That is, for the zinc-plated layer, a Fe—Zn alloy layer and a η-Zn layer are preferably formed in this order from the base steel material side. The thickness of the Fe—Zn alloy layer in the zinc-plated layer is not particularly limited. The Zn plated layer may be an alloyed zinc-plated layer in which alloying of Fe and Zn has progressed to the surface of the plated layer.

The thickness of the zinc-plated layer or the alloyed zinc-plated layer is, for instance, preferably 5 to 150 μm, and more preferably 20 to 60 μm. When the thickness of these plated layers is less than 5 μm, the thickness of the third region is less than 5 μm, and the base metal corrosion resistance of the plated layers is deteriorated. These plated layers having a thickness of more than 150 μm are difficult to produce.

The dipping time in the first plating bath is preferably, for instance, in the range of 10 to 600 seconds. As a result, the Fe—Zn alloy layer is formed in the zinc-plated layer. When the dipping time is less than 10 seconds, the Fe—Zn alloy layer is not sufficiently formed, and finally, the interface between the plated layer and the base steel material hardly becomes an uneven surface, and the adhesion of the plated layer is deteriorated. On the other hand, when the dipping time exceeds 600 seconds, the Fe—Zn alloy layer excessively grows, and the adhesion of the plated layer may be rather deteriorated.

The bath temperature of the first plating bath is preferably in the range of 420 to 480° C. When the bath temperature is high, the growth of the Fe—Zn alloy layer is accelerated, the Fe—Zn alloy layer is excessively formed, and the adhesion of the plated layer may be rather deteriorated. When the bath temperature is low, plating defects such as bare spots and foreign matter adhesion are likely to occur.

As necessary, the plating adhesion amount is adjusted by spraying wiping with N$_2$ gas after the steel sheet is pulled up from the first plating bath, by the speed at which the steel sheet is pulled out from the plating bath, or the like.

Next, in the second plating process, the base steel material on which the zinc-plated layer or the alloyed zinc-plated layer is formed is dipped in the second plating bath and then pulled up.

The composition of the second plating bath may be substantially the same as the chemical composition of the plated layer. The composition of the second plating bath may be appropriately adjusted to fall within the range of the chemical composition of the plated layer of the embodiment. Specifically, the amount of Mg, Al, and other alloying elements other than Zn is preferably about 1.01 to 1.20 times greater than the target value of the chemical composition of the plated layer so that the range of the chemical composition of the plated layer of the embodiment is satisfied.

When the base steel material on which the zinc-plated layer is formed is dipped in the second plating bath, Zn dissolves from the $\eta$-Zn layer included in the zinc-plated layer, and Zn is replaced with Al in the Fe—Zn alloy layer so that the third region which includes the Fe—Al alloy layer is formed.

When the base steel material on which the alloyed zinc-plated layer is formed is dipped in the second plating bath, Zn is replaced with Al in the Fe—Zn alloy layer in the alloyed zinc-plated layer, thereby the third region which includes the Fe—Al alloy phase is formed.

The dipping time in the second plating bath is preferably, for instance, in the range of 5 to 300 seconds. As a result, the growth of the third region and the second region is promoted. When the dipping time is less than 5 seconds, the second region and the third region are not sufficiently formed, and the interface between the plated layer and the base steel material hardly becomes an uneven surface, so that base metal corrosion resistance is deteriorated and adhesion of the plated layer is deteriorated. On the other hand, when the dipping time exceeds 300 seconds, the second region and the third region excessively grow, and the plated layer itself is easily cracked.

The bath temperature of the second plating bath is preferably in the range of 400 to 680° C., and may be 460 to 670° C. When the bath temperature is high, the growth of the Fe—Al alloy phase is accelerated, the Fe—Al alloy phase is excessively formed, there is a possibility that another interface alloy layer is formed between the third region and the base steel material, and the plating facility is severely consumed. When the bath temperature is low, plating defects such as bare spots and contamination of exogenous material are likely to occur.

As necessary, an adherent amount of plating is adjusted by spray wiping with $N_2$ gas after the steel sheet is pulled up from the second plating bath, by controlling the speed at which the steel sheet is pulled out from the plating bath, or the like.

Next, as the cooling process, the plated layer is cooled (controlled cooling). In the cooling process, cooling is performed at an average cooling rate of less than 5.0° C./sec, more preferably 2.0° C./sec or less until the temperature of the plated layer changes from the bath temperature to 330° C. as a controlled cooling stop temperature. The controlled cooling stop temperature is preferably 330° C. or lower. The cooling is performed, for instance, by blowing a cooling gas. When the cooling gas is blown for cooling, a plurality of blowing nozzles for the cooling gas may be arranged along the conveying path of the base steel material, and the cooling gas may be blown from the nozzles. The kind of the cooling gas may be air, nitrogen ($N_2$), argon, or the like, and is preferably nitrogen ($N_2$) gas.

When cooling is performed at an average cooling rate of less than 5.0° C./sec, the alloying reaction between Fe and Al remaining in an unreacted state proceeds in the surface of the plated layer, and Al and Fe in the plated layer are consumed, and as a result, the first region where the Fe concentration is less than 5.0 mass % is formed. Because Al is consumed in the reaction with Fe, the precipitation of the Al-containing phase decreases, and the area fraction of the Al-containing phase decreases in the first region. In addition, cooling is performed at an average cooling rate of less than 5.0° C./sec from the bath temperature to the controlled cooling stop temperature, for instance, 330° C., thereby the Mg—Zn phase is precipitated. Furthermore, the eutectic reaction of the Zn phase and the $MgZn_2$ phase proceeds to promote the formation of a binary eutectic structure of the $\eta$-Zn phase and the $MgZn_2$ phase ([Binary eutectic structure of $Zn/MgZn_2$]).

On the other hand, on the base steel material side of the plated layer, the reaction between Fe diffused from the base steel material and Al in the plating bath proceeds, whereby the second region where the Fe concentration is 5.0% or more is formed. In the second region, a large amount of the Fe—Al alloy phase is included, and the Mg—Zn phase may be formed.

As described above, the plated steel material of the embodiment can be produced.

In the plated steel material of the embodiment, a method of forming a plated layer by a vapor deposition plating method, a thermal spraying method, a cold spraying method, or the like may be applied, and the same effect as in the case of forming by a hot-dip plating method can be obtained.

EXAMPLES

Hereinafter, the effects of the present invention will be specifically described with reference to Examples.

As the base steel material, base steel materials (SS400 described in JIS G 3101) having the following shapes A, B, and C were used.

A: Steel sheet having length of 200 mm×sheet width of 100 mm×thickness of 3.2 mm.

B: Angled member (Length: 200 mm, short side length: 50 mm, sheet thickness: 3.2 mm) having L-shape in a cross-sectional view obtained by bending the steel sheet A so that the bending angle is 90° at the center position of the sheet width.

C: Expanded metal (XS-62 (sheet thickness 3.2 mm) specified in JIS G 3351:1987). For the expanded metal, the "surface of the plated steel material" is a surface corresponding to a plane orthogonal to the sheet thickness direction in the entire plate-like shape having a plurality of through-holes.

The material B and the material C were difficult to observe and measure the cross-sectional microstructure and evaluate plating adhesion. Therefore, in the test example where the base steel material was the material B or the material C, the base steel material was changed to the material A to separately produce a plated steel material, and the plated steel material having the material A as the base steel material was observed, measured, and evaluated.

The blasting process was performed on the base steel material. In the blasting process, a steel shot (TSH-30) manufactured by WINOA IKK JAPAN CO., LTD. was used as a shot material, and the surface of the base steel material was impacted by the shot material using air pressure according to Abrasive blast-cleaning methods for surface preparation (JIS Z 0310:2016). The shoot amount of the shot material was as shown in Tables 2A and 2B. The shoot conditions were the shoot pressure: 0.5 MPa, the distance from the nozzle to the sample (base steel material): 800 mm, and the shoot angle: 90°.

Next, the base steel material after the blasting process was subjected to the flux-applying process. In this process, the base steel material was immersed in a flux aqueous solution ($ZnCl_2/NaCl/SnCl_2$=220 g/20 g/10 g/L) at 80° C. for 30 seconds, then pulled up, and sufficiently dried in a drying furnace at 150° C.

Next, the base steel material after the flux-applying process was dipped in the first plating bath and then pulled up, and then dipped in the second plating bath and then pulled up. The bath temperature of the first plating bath was 460°

C., and the bath temperature of the second plating bath was as shown in Tables 2A and 2B. The dipping time of the first plating bath was 180 seconds, and the dipping time of the second plating bath was as shown in Tables 2A and 2B. The first plating bath was a zinc plating bath including 95% or more of Zn. The thickness of the zinc-plated layer formed by dip in the first plating bath was in the range of 5 to 150 μm, and the zinc-plated layer included the Fe—Zn alloy layer and the n-zinc layer. The second plating bath was a Zn—Al—Mg plating bath including Al, Mg, other alloying elements, and Zn. The composition of the second plating bath was appropriately adjusted so that the composition of the second plating bath was substantially equal to the final chemical composition of the plated layer, or has a target value for the final chemical composition of the plated layer. Specifically, the amount of Mg, Al, and other alloying elements other than Zn was 1.2 times higher than the target value for the chemical composition of the plated layer.

Next, as the cooling process, the base steel material pulled up from the second plating bath was blown with compressed air as a cooling gas, and cooled at a controlled cooling rate from the plating bath temperature to 330° C. as the controlled cooling stop temperature. The cooling rate was as shown in Tables 2A and 2B. The base steel material was air-cooled in the temperature range of 330° C. or lower. In this way, a plated steel material was produced.

The composition of the plated layer was measured as follows: from a sample cut into 30 mm×30 mm, elements were eluted into a hydrochloric acid solution by the above-described method; and the elements were subjected to quantitative analysis through ICP emission spectrometry.

Whether or not the boundary between the plated layer and the base steel material was an uneven surface satisfying the formula (1) was confirmed as follows.

First, a small piece sample of 20 mm×15 mm×3.2 mm was collected from the plated steel material, embedded in a resin, and then polished to mirror-polished finish to expose a cross section perpendicular to the surface of the plated steel material. The test piece was observed with a field emission scanning electron microscope SEM ("JSM-7000F", manufactured by JEOL Ltd., acceleration voltage: 15 kV) to obtain image data. When observed with the SEM at a magnification of 1000 times or more, a cross section of the plated steel material having a length of 100 μm in a direction parallel to the surface of the plated steel material was used as an observation region. The resolution of the image was greater than or equal to 2560 pixels in width and greater than or equal to 1920 pixels in height.

For the image data, $L_0$ and $L$ were obtained by the above-described method. The plated layer and the base steel material were discriminated based on the Fe concentration of 90% by the above-described EPMA analysis, and the area where the Fe concentration was 90% or more was determined as the base steel material. Then, it was evaluated whether the relationship between $L_0$ and $L$ satisfied the formula (1). The calculation results (values) on the left side of the formula (1) are shown in Tables 3A and 3B.

The boundary of the first region, the second region, and the third region of the plated layer were determined as follows.

A small piece sample of 20 mm×15 mm×3.2 mm was collected from the plated steel material, embedded in a resin, and then polished to mirror-polished finish to expose a cross section perpendicular to the surface of the plated steel material. The test piece was observed with an electron beam probe microanalyzer equipped with a scanning electron microscope (SEM-EPMA, EPMA measurement device:

JXA-8230, manufactured by JEOL Ltd., acceleration voltage: 15 kV, current: 0.05 μA, irradiation time: 50 ms) to measure the Fe concentration through point analysis.

First, as the first stage measurement, as shown in FIG. 3, linear analysis lines parallel to a direction orthogonal to the thickness direction of the plated layer were set in the cross section of the exposed plated layer. Ten analysis lines were set at equal intervals along the thickness direction of the plated layer. On the analysis line, 10 measurement points were set at intervals of 10 μm in a direction orthogonal to the thickness direction of the plated layer. In FIG. 3, the alternate long and short dash line is the analysis line, and the black dot on the analysis line is a measurement point.

At each measurement point on the analysis line, the Fe concentration (mass %) in the plated layer was measured by point analysis. The measurement conditions for the point analysis were as described above. For each analysis line, the average value of the Fe concentration at 10 measurement points was obtained, and the average value was defined as the Fe concentration in each analysis line. Then, the analysis line A where the Fe concentration was less than 5.0% and the Fe concentration was closest to 5.0% and the analysis line B where the Fe concentration was more than 5.0% and the Fe concentration was closest to 5.0% were specified. Further, the analysis line C where the Fe concentration was less than 30.0% and the Fe concentration was closest to 30.0% and the analysis line D where the Fe concentration was more than 30.0% and the Fe concentration was closest to 30.0% were specified.

Next, as the second stage measurement, the analysis line where the Fe concentration was 5.0% and the analysis line where the Fe concentration was 30.0% were specified by the above-described method. The analysis line where the Fe concentration was 5.0 mass % was defined as the boundary line, and the area closer to the surface side of the plated steel material than the analysis line was defined as the first region. In addition, the analysis line where the Fe concentration was 30.0 mass % was defined as the boundary line, and the area closer to the base steel material than the analysis line was defined as the third region. The second region was the area between the analysis line where the Fe concentration was 5.0 mass % and the analysis line where the Fe concentration was 30.0 mass %.

Next, the area fraction of the phases/microstructures in the first region, the second region, and the third region was specified as follows. A cross section in the thickness direction of the plated layer perpendicular to the surface of the base steel material was observed using the sample used to specify the first region, the second region, and the third region as it was. The observation magnification in SEM was set to be 200 to 50000 times, and the cross section of the plated layer in the region of 36000 μm² was observed. There is a possibility that a local visual field of the plated layer is observed in the visual field of the SEM. Therefore, in order to obtain the average information of the plated layer, 25 visual fields were selected from an arbitrary cross section and used as the average information. That is, the area fraction of the phases or microstructures constituting the metallographic structure of the plated layer was determined by observing the metallographic structure in a visual field of 36000×25 μm² in total.

First, the eutectic structure consisting of the Zn phase and the $MgZn_2$ phase and showing a lamellar structure was defined as the [Binary eutectic structure of $Zn/MgZn_2$]. In the region other than the [Binary eutectic structure of $Zn/MgZn_2$], the phase including Zn and 20 to 99 mass % of Al was defined as the Al-containing phase. In addition, the phase including Zn and 20 to 60 mass % of Mg was defined as the Mg—Zn phase. Further, the phase including Al and 20 to 60 mass % of Fe was defined as the Fe—Al alloy phase. Then, the area fraction of these phases and microstructures was determined.

The presence or absence of the $Mg_2Sn$ phase was confirmed by the above-described method. When a diffraction peak was detected at 23.4±0.3°, it was determined that the $Mg_2Sn$ phase was present. The results are shown in Tables 3A and 3B.

The plating adhesion was evaluated as follows. The plated steel material was subjected to a chipping test. Using a gravelometer, 400 g of crushed stone No. 6 (JIS A500, particle size 5 to 13 mm) was struck against the test piece at room temperature from a distance of 50 cm at an air pressure of 400 kPa. The shoot angle was 90° with respect to the surface of the base steel material. Thereafter, the test piece was subjected to ultrasonic cleaning (room temperature, pure water, 10 min), and plating adhesion was evaluated from the difference (weight loss) between the weight ($g/m^2$) per unit area of the test piece before ultrasonic cleaning and the weight ($g/m^2$) per unit area of the test piece after ultrasonic cleaning. The evaluation criteria were as follows, and AAA, AA, and A were regarded as acceptable.

AAA: Weight loss is less than 10 $g/m^2$

AA: Weight loss is 10 $g/m^2$ or more and less than 60 $g/m^2$

A: Weight loss is 60 $g/m^2$ or more and less than 120 $g/m^2$

B: Weight loss is 120 $g/m^2$ or more

The corrosion resistance after coating was evaluated as follows. An undercoat film, a midcoat film, and a topcoat film were applied to the surface of the plated layer of the plated steel material. The undercoat film was formed by applying an epoxy resin paint for zinc-plating surface manufactured by Nippon Paint Co., Ltd. under the trade name of "HI-PON 20 DECRO", and the film thickness was 50 μm. The midcoat film was formed by applying the trade name "HI-PON 30 Mastic Midcoat K" manufactured by Nippon Paint Co., Ltd., and the film thickness was 30 μm. The topcoat film was formed by applying the trade name "HI-PON 50 Topcoat" manufactured by Nippon Paint Co., Ltd., and the film thickness was 30 μm. A cut defect reaching the base steel material was applied to the painted plated steel material with a cutter knife, and the plated steel material was subjected to a corrosion acceleration test specified in JASO-CCT-M609. After 360 cycles, corrosion resistance after coating was determined by the maximum swelling width on one side of the cut defect. The evaluation criteria were as follows, and AAA, AA, and A were regarded as acceptable.

AAA: 0.5 mm or less

AA: more than 0.5 mm and 1 mm or less

A: more than 1 mm and 2 mm or less

B: More than 2 mm

The red rust resistance was evaluated as follows. The plated steel material was subjected to a corrosion acceleration test specified in JASO-CCT-M609. Then, the number of cycles in which red rust occurred was measured. Based on the number of cycles in which red rust occurred, evaluation was performed according to the following evaluation criteria.

AAA: Red rust occurrence cycle is 1200 cycles or more

AA: Red rust occurrence cycle is 900 cycles or more and less than 1200 cycles

A: Red rust occurrence cycle is 540 cycles or more and less than 900 cycles

B: Red rust occurrence cycle is less than 540 cycles

The base metal corrosion resistance was evaluated as follows. A sample obtained by cutting the plated steel material into a length of 150 mm and a width of 70 mm was subjected to a corrosion acceleration test specified in JASO-CCT-M609. Then, the corrosion depth (μm) in the sample after 1560 cycles was measured for evaluation. In the measurement, a 30 mm cross section was taken and observed at the half position (75 mm) in the longitudinal direction and the central area in the width direction in the sample. For observation, a resin-embedded and mirror-polished cross section was observed using an optical microscope at a magnification of 40 times, and the visual field was photographed. The maximum value of the corrosion depth (μm) was measured at 30 mm in the width direction in the cross section. The evaluation criteria were as follows, and AAA, AA, and A were regarded as acceptable.

AAA: less than 50 μm

AA: 50 μm or more and less than 200 μm

A: 200 μm or more and less than 800 μm

B: 800 μm or more

The sacrificial corrosion resistance was evaluated as follows. The plated steel material was cut in a direction perpendicular to the surface of the plated steel material using a fine cutter to expose a cut end surface. That is, in the cut end surface, the cross section of the plated layer and the cross section of the base steel material were exposed. The cut end surface was subjected to a neutral salt spray test specified in JIS Z2371: 2015, and the time (h) until red rust occurred was measured at the cut end surface. The evaluation criteria were as follows, and AAA, AA, and A were regarded as acceptable.

AAA: 2400 h or more

AA: 1500 h or more and less than 2400 h

A: 720 h or more and less than 1500 h

B: Less than 720 h

As shown in Tables 1A to 4B, in Examples 1 to 35, the chemical composition of the plated layer, the thickness of the first region, the area fraction of the Al-containing phase in the first region, the thickness of the second region, and the thickness of the third region were within the range of the present invention. As a result, adhesion of the plated layer, corrosion resistance after coating, red rust resistance, base metal corrosion resistance, and sacrificial corrosion resistance were excellent.

The first region in Examples 1 to 35 included, as the balance, one or more of a $Mg_2Si$ phase, a $Mg_2Sn$ phase, a Zn phase, an Al—Ca—Zn phase, an Al—Ca—Si—Zn phase, a Ca—Zn phase, and a Mg—Al—Si—Zn phase. Furthermore, in the first region in some Examples, the Fe—Al alloy phase was included of 3% or less in an area fraction. In the third region in Examples 1 to 35, the Fe—Al alloy phase was included as the balance. Furthermore, as the balance in the second region and the third region, one or more of a $Mg_2Si$ phase, a $Mg_2Sn$ phase, a Zn phase, an Al—Ca—Zn phase, an Al—Ca—Si—Zn phase, a Ca—Zn phase, and a Mg—Al—Si—Zn phase was optionally included.

As shown in Tables 1A to 4B, in Comparative Examples 36 to 46, any of the chemical composition of the plated layer, the thickness of the first region, the area fraction of the Al-containing phase in the first region, the thickness of the second region, and the thickness of the third region were out of the range of the present invention. As a result, at least one of adhesion of the plated layer, corrosion resistance after coating, red rust resistance, base metal corrosion resistance, and sacrificial corrosion resistance was deteriorated.

Comparative Example 36 had an insufficient Al amount in the plated layer. As a result, the thicknesses of the second region and the thicknesses of the third region were insufficient, and red rust resistance and base metal corrosion resistance were deteriorated.

Comparative Example 37 had an excessive Al amount in the plated layer. As a result, the flux reaction was disturbed, and the appearance of the plated layer was significantly deteriorated.

In Comparative Example 38, the plated layer had an insufficient Mg amount and an excessive Fe amount. As a result, corrosion resistance after coating, red rust resistance, base metal corrosion resistance, and sacrificial corrosion resistance were deteriorated.

Comparative Example 39 had an excessive Mg amount in the plated layer. As a result, the flux reaction was disturbed, and the appearance was significantly deteriorated.

Comparative Example 40 had an excessive Si amount in the plated layer. In addition, the amount of Fe was insufficient. As a result, the thicknesses of the second region and the thicknesses of the third region were insufficient, and red rust resistance and base metal corrosion resistance were deteriorated.

Comparative Example 41 had an excessive Ca amount in the plated layer. In addition, the amount of Fe was insufficient. Further, the flux reaction was disturbed, and the appearance was significantly deteriorated. In Comparative Example 42, the shoot amount of the shot was insufficient in the blasting process. As a result, the formula (1) was not satisfied, and adhesion of the plated layer was deteriorated.

In Comparative Example 43, the cooling rate was too high in the cooling process. As a result, the area fraction of the Al-containing phase in the first region was out of the range of the present invention, and corrosion resistance after coating was deteriorated.

In Comparative Example 44, the dipping time in the plating bath was insufficient. As a result, the thickness of the second region was insufficient, and red rust resistance was deteriorated.

In Comparative Example 45, the dipping time in the plating bath was insufficient. As a result, the thickness of the third region was insufficient, and base metal corrosion resistance was deteriorated.

In Comparative Example 46, shot blasting was not performed. As a result, sufficient strain could not be introduced into the base steel material before plating, and thus the formula (1) was not satisfied, and adhesion of the plated layer was deteriorated.

TABLE 1A

| | | | COMPOSITION OF PLATED LAYER (mass %) | | | | | | | | | |
| | | | | | | | | | | OTHER ELEMENTS | | Mg/ |
| CLASSIFICATION | No. | SHAPE | Zn | Al | Mg | Sn | Si | Ca | Fe | ELEMENT | TOTAL (%) | (Zn + Mg) (%) |
|---|---|---|---|---|---|---|---|---|---|---|---|---|
| EXAMPLE | 1 | A | 86.3 | 5.0 | 0.5 | 0 | 0 | 0 | 8.2 | — | 0 | 0.58 |
| EXAMPLE | 2 | A | 81.7 | 7.0 | 2.0 | 0.04 | 0 | 0.05 | 9.2 | Co | 0.006 | 2.39 |
| EXAMPLE | 3 | A | 78.6 | 9.9 | 4.2 | 0 | 0.1 | 0.05 | 7.1 | Bi | 0.004 | 5.07 |
| EXAMPLE | 4 | B | 76.4 | 10.1 | 3.6 | 0 | 0 | 0.05 | 9.8 | V | 0.008 | 4.50 |
| EXAMPLE | 5 | A | 73.5 | 11.2 | 5.0 | 0 | 0 | 0.05 | 10.2 | Pb: 0.02 In: 0.01 | 0.03 | 6.37 |
| EXAMPLE | 6 | B | 69.6 | 11.1 | 5.0 | 0 | 0 | 0.1 | 14.2 | Pb | 0.02 | 6.70 |
| EXAMPLE | 7 | B | 72.5 | 11.9 | 5.1 | 0 | 0 | 0.1 | 10.4 | — | 0 | 6.57 |
| EXAMPLE | 8 | A | 72.5 | 12.0 | 5.3 | 0 | 0 | 0.1 | 10.1 | — | 0 | 6.81 |
| EXAMPLE | 9 | A | 74.1 | 12.0 | 3.3 | 0 | 0 | 0.1 | 10.5 | — | 0 | 4.26 |
| EXAMPLE | 10 | A | 71.6 | 12.1 | 5.3 | 0 | 0 | 0.1 | 10.9 | — | 0 | 6.89 |
| EXAMPLE | 11 | A | 61.0 | 12.2 | 15.0 | 0 | 0 | 0.1 | 11.7 | Sr | 0.01 | 19.74 |
| EXAMPLE | 12 | A | 65.4 | 13.8 | 6.4 | 0 | 0 | 0.1 | 14.3 | Li | 0.01 | 8.91 |
| EXAMPLE | 13 | A | 61.6 | 15.9 | 9.0 | 0.05 | 0 | 0.2 | 13.2 | Ag | 0.01 | 12.74 |
| EXAMPLE | 14 | A | 62.3 | 16.0 | 5.0 | 0 | 0 | 0.2 | 16.5 | P | 0.001 | 7.43 |
| EXAMPLE | 15 | B | 59.6 | 18.2 | 5.5 | 0 | 0 | 0.2 | 16.5 | Ni | 0.001 | 8.45 |
| EXAMPLE | 16 | C | 61.8 | 19.1 | 3.4 | 0 | 0 | 0.2 | 15.5 | Sb | 0.01 | 5.22 |
| EXAMPLE | 17 | C | 58.3 | 19.1 | 3.8 | 0.2 | 0 | 0.2 | 18.4 | Mn | 0.02 | 6.12 |
| EXAMPLE | 18 | A | 57.9 | 19.0 | 3.8 | 2.0 | 0 | 0.2 | 17.1 | In | 0.02 | 6.16 |
| EXAMPLE | 19 | A | 57.5 | 19.2 | 5.0 | 0 | 0 | 0.2 | 18.1 | — | 0 | 8.00 |
| EXAMPLE | 20 | A | 58.2 | 19.9 | 4.7 | 0 | 0 | 2.0 | 15.2 | W | 0.02 | 7.47 |
| EXAMPLE | 21 | B | 57.3 | 19.8 | 4.5 | 0 | 0 | 0.2 | 18.2 | B | 0.01 | 7.28 |
| EXAMPLE | 22 | C | 56.2 | 20.0 | 5.4 | 0 | 0 | 0.2 | 18.2 | P | 0.01 | 8.77 |
| EXAMPLE | 23 | A | 56.2 | 22.1 | 4.0 | 0 | 0 | 0.2 | 17.5 | La | 0.02 | 6.65 |

TABLE 1B

| | | | COMPOSITION OF PLATED LAYER (mass %) | | | | | | | | | |
| | | | | | | | | | | OTHER ELEMENTS | | Mg/ |
| CLASSIFICATION | No. | SHAPE | Zn | Al | Mg | Sn | Si | Ca | Fe | ELEMENT | TOTAL (%) | (Zn + Mg) (%) |
|---|---|---|---|---|---|---|---|---|---|---|---|---|
| EXAMPLE | 24 | A | 49.6 | 22.2 | 8.0 | 0 | 0 | 0.8 | 19.4 | Ce | 0.01 | 13.89 |
| EXAMPLE | 25 | A | 55.0 | 22.1 | 4.0 | 0 | 0.04 | 0.2 | 18.7 | Zr | 0.01 | 6.79 |
| EXAMPLE | 26 | A | 63.7 | 23.9 | 5.0 | 0 | 2.0 | 0.2 | 5.2 | W | 0.01 | 7.28 |
| EXAMPLE | 27 | A | 53.5 | 22.8 | 4.0 | 0 | 0 | 0.2 | 19.5 | Cr | 0.05 | 6.96 |
| EXAMPLE | 28 | A | 54.0 | 22.7 | 4.0 | 0 | 0 | 0.2 | 19.1 | Mo | 0.01 | 6.90 |
| EXAMPLE | 29 | A | 47.9 | 23.5 | 5.6 | 0 | 0 | 0.8 | 22.2 | — | 0 | 10.47 |
| EXAMPLE | 30 | A | 50.8 | 23.2 | 3.9 | 0 | 0 | 0.8 | 21.3 | Ti | 0.02 | 7.13 |

TABLE 1B-continued

| CLASSIFICATION | No. | SHAPE | COMPOSITION OF PLATED LAYER (mass %) | | | | | | | OTHER ELEMENTS | | Mg/ |
| | | | Zn | Al | Mg | Sn | Si | Ca | Fe | ELEMENT | TOTAL (%) | (Zn + Mg) (%) |
|---|---|---|---|---|---|---|---|---|---|---|---|---|
| EXAMPLE | 31 | A | 50.8 | 23.4 | 4.3 | 0 | 0 | 0.8 | 20.5 | Cu | 0.2 | 7.80 |
| EXAMPLE | 32 | A | 42.7 | 28.2 | 4.0 | 0 | 0 | 1.0 | 24.1 | Y | 0.02 | 8.57 |
| EXAMPLE | 33 | A | 36.4 | 30.2 | 3.2 | 0 | 0 | 2.0 | 28.2 | Nb | 0.01 | 8.08 |
| EXAMPLE | 34 | A | 27.7 | 34.3 | 3.5 | 0 | 0 | 2.0 | 32.5 | — | 0 | 11.22 |
| EXAMPLE | 35 | A | 16.6 | 40.0 | 2.2 | 0 | 0 | 2.0 | 39.2 | — | 0 | 11.70 |
| COMPARATIVE EXAMPLE | 36 | A | 88.1 | 4.6 | 3.0 | 0 | 0 | 0.2 | 4.1 | — | 0 | 3.29 |
| COMPARATIVE EXAMPLE | 37 | A | 16.4 | 43.1 | 7.0 | 0 | 0.1 | 0.2 | 33.2 | — | 0 | 29.91 |
| COMPARATIVE EXAMPLE | 38 | A | 39.6 | 18.2 | 0.4 | 0 | 0.2 | 0.2 | 41.4 | — | 0 | 1.00 |
| COMPARATIVE EXAMPLE | 39 | A | 31.6 | 18.1 | 16.0 | 0 | 0 | 0.2 | 34.1 | — | 0 | 33.61 |
| COMPARATIVE EXAMPLE | 40 | A | 73.2 | 18.2 | 3.0 | 0 | 2.2 | 0.2 | 3.2 | — | 0 | 3.94 |
| COMPARATIVE EXAMPLE | 41 | A | 71.7 | 18.1 | 3.0 | 0 | 0.2 | 2.5 | 4.5 | — | 0 | 4.02 |
| COMPARATIVE EXAMPLE | 42 | A | 69.3 | 18.1 | 3.0 | 0 | 0.2 | 0.2 | 9.2 | — | 0 | 4.15 |
| COMPARATIVE EXAMPLE | 43 | A | 67.1 | 18.1 | 3.0 | 0 | 0.2 | 0.2 | 11.4 | — | 0 | 4.28 |
| COMPARATIVE EXAMPLE | 44 | A | 66.2 | 17.9 | 2.3 | 0 | 0.2 | 0.2 | 13.2 | — | 0 | 3.36 |
| COMPARATIVE EXAMPLE | 45 | A | 66.4 | 18.0 | 2.0 | 0 | 0.6 | 0.2 | 12.8 | — | 0 | 2.92 |
| COMPARATIVE EXAMPLE | 46 | A | 69.6 | 18.0 | 3.0 | 0 | 0.2 | 0.2 | 9.0 | — | 0 | 4.13 |

The underline indicates that the value is out of the range of the present invention.

TABLE 2A

| CLASSIFICATION | No. | PRODUCTION CONDITION | | | |
| | | SHOOT AMOUNT OF SHOT BLASTING (kg/m$^2$) | BATH TEMPERATURE OF SECOND PLATING BATH (° C.) | DIPPING TIME (s) | COOLING RATE FROM BATH TEMPERATURE TO 330° C. (° C./s) |
|---|---|---|---|---|---|
| EXAMPLE | 1 | 5 | 460 | 60 | 4.5 |
| EXAMPLE | 2 | 15 | 490 | 60 | 4.5 |
| EXAMPLE | 3 | 20 | 510 | 170 | 4.5 |
| EXAMPLE | 4 | 20 | 500 | 60 | 2.0 |
| EXAMPLE | 5 | 30 | 530 | 120 | 2.0 |
| EXAMPLE | 6 | 35 | 540 | 120 | 4.0 |
| EXAMPLE | 7 | 40 | 550 | 120 | 1.0 |
| EXAMPLE | 8 | 10 | 550 | 60 | 1.0 |
| EXAMPLE | 9 | 40 | 550 | 60 | 1.0 |
| EXAMPLE | 10 | 10 | 550 | 60 | 1.0 |
| EXAMPLE | 11 | 50 | 550 | 120 | 1.0 |
| EXAMPLE | 12 | 50 | 550 | 120 | 1.0 |
| EXAMPLE | 13 | 50 | 550 | 120 | 1.0 |
| EXAMPLE | 14 | 50 | 550 | 120 | 1.0 |
| EXAMPLE | 15 | 50 | 550 | 120 | 1.0 |
| EXAMPLE | 16 | 50 | 550 | 5 | 1.0 |
| EXAMPLE | 17 | 50 | 550 | 100 | 1.0 |
| EXAMPLE | 18 | 50 | 550 | 100 | 1.0 |
| EXAMPLE | 19 | 50 | 550 | 180 | 1.0 |
| EXAMPLE | 20 | 50 | 550 | 180 | 1.0 |
| EXAMPLE | 21 | 50 | 550 | 180 | 1.0 |
| EXAMPLE | 22 | 50 | 550 | 180 | 1.0 |
| EXAMPLE | 23 | 50 | 540 | 180 | 1.0 |

TABLE 2B

| | | PRODUCTION CONDITION | | | |
|---|---|---|---|---|---|
| CLASSIFICATION | No. | SHOOT AMOUNT OF SHOT BLASTING (kg/m$^2$) | BATH TEMPERATURE OF SECOND PLATING BATH (° C.) | DIPPING TIME (s) | COOLING RATE FROM BATH TEMPERATURE TO 330° C. (° C./s) |
| EXAMPLE | 24 | 50 | 550 | 180 | 1.0 |
| EXAMPLE | 25 | 50 | 550 | 180 | 1.0 |
| EXAMPLE | 26 | 50 | 560 | 100 | 1.0 |
| EXAMPLE | 27 | 50 | 550 | 100 | 1.0 |
| EXAMPLE | 28 | 50 | 540 | 100 | 1.0 |
| EXAMPLE | 29 | 50 | 550 | 180 | 1.0 |
| EXAMPLE | 30 | 50 | 550 | 300 | 1.0 |
| EXAMPLE | 31 | 50 | 550 | 220 | 1.0 |
| EXAMPLE | 32 | 50 | 550 | 220 | 1.0 |
| EXAMPLE | 33 | 50 | 600 | 220 | 1.0 |
| EXAMPLE | 34 | 50 | 600 | 180 | 1.0 |
| EXAMPLE | 35 | 50 | 670 | 100 | 1.0 |
| COMPARATIVE EXAMPLE | 36 | 5 | 430 | 5 | 3.0 |
| COMPARATIVE EXAMPLE | 37 | 5 | 680 | 100 | 3.0 |
| COMPARATIVE EXAMPLE | 38 | 5 | 540 | 100 | 3.0 |
| COMPARATIVE EXAMPLE | 39 | 5 | 630 | 100 | 3.0 |
| COMPARATIVE EXAMPLE | 40 | 5 | 540 | 100 | 3.0 |
| COMPARATIVE EXAMPLE | 41 | 5 | 540 | 100 | 3.0 |
| COMPARATIVE EXAMPLE | 42 | 3 | 550 | 100 | 3.0 |
| COMPARATIVE EXAMPLE | 43 | 5 | 550 | 100 | 6.0 |
| COMPARATIVE EXAMPLE | 44 | 5 | 550 | 3 | 3.0 |
| COMPARATIVE EXAMPLE | 45 | 5 | 550 | 3 | 3.0 |
| COMPARATIVE EXAMPLE | 46 | 0 | 550 | 100 | 3.0 |

The underline indicates that the value is out of the range of preferable production conditions.

TABLE 3A

| | | CROSS SECTIONAL MICROSTRUCTURE | | | | | |
|---|---|---|---|---|---|---|---|
| | | FIRST REGION | | | | | |
| CLASSIFICATION | No. | VALUE ON LEFT SIDE OF FORMULA (1) (%) | THICKNESS (μm) | AREA FRACTION OF Al-CONTAINING PHASE (%) | AREA FRACTION OF Mg—Zn PHASE (%) | AREA FRACTION OF BINARY EUTECTIC STRUCTURE OF Zn/ MgZn$_2$ (%) | SECOND REGION THICKNESS (μm) |
| EXAMPLE | 1 | 2.0 | 13 | 4 | 2 | 0 | 12 |
| EXAMPLE | 2 | 3.1 | 15 | 1 | 5 | 1 | 15 |
| EXAMPLE | 3 | 4.1 | 11 | 1 | 15 | 2 | 8 |
| EXAMPLE | 4 | 4.1 | 13 | 0 | 9 | 1 | 9 |
| EXAMPLE | 5 | 4.5 | 20 | 0 | 21 | 5 | 29 |
| EXAMPLE | 6 | 5.1 | 13 | 3 | 21 | 4 | 18 |
| EXAMPLE | 7 | 5.4 | 5 | 0 | 26 | 6 | 22 |
| EXAMPLE | 8 | 2.2 | 5 | 0 | 26 | 6 | 22 |
| EXAMPLE | 9 | 5.4 | 24 | 0 | 14 | 4 | 12 |
| EXAMPLE | 10 | 2.2 | 5 | 0 | 26 | 6 | 21 |
| EXAMPLE | 11 | 6.0 | 24 | 0 | 44 | 3 | 20 |
| EXAMPLE | 12 | 6.2 | 23 | 0 | 44 | 12 | 24 |
| EXAMPLE | 13 | 6.5 | 23 | 0 | 40 | 3 | 29 |
| EXAMPLE | 14 | 7.5 | 22 | 0 | 40 | 10 | 31 |
| EXAMPLE | 15 | 7.5 | 30 | 0 | 38 | 9 | 29 |
| EXAMPLE | 16 | 7.8 | 33 | 0 | 33 | 6 | 16 |
| EXAMPLE | 17 | 7.9 | 12 | 0 | 35 | 7 | 22 |
| EXAMPLE | 18 | 8.2 | 34 | 0 | 39 | 6 | 20 |
| EXAMPLE | 19 | 8.2 | 22 | 0 | 41 | 12 | 29 |

TABLE 3A-continued

| | | | | | | | |
|---|---|---|---|---|---|---|---|
| EXAMPLE | 20 | 8.4 | 21 | 0 | 35 | 10 | 31 |
| EXAMPLE | 21 | 8.1 | 29 | 0 | 33 | 11 | 50 |
| EXAMPLE | 22 | 8.2 | 22 | 0 | 45 | 12 | 44 |
| EXAMPLE | 23 | 8.1 | 21 | 0 | 33 | 9 | 60 |

| | | CROSS SECTIONAL MICROSTRUCTURE | | | | | |
|---|---|---|---|---|---|---|---|
| | | SECOND REGION | | | THIRD REGION | | |
| | | | AREA FRACTION | | | | |
| CLASSIFICATION | No. | AREA FRACTION OF Mg—Zn PHASE (%) | OF BINARY EUTECTIC STRUCTURE OF Zn/MgZn$_2$ (%) | AREA FRACTION OF Fe—Al PHASE | THICKNESS (μm) | AREA FRACTION OF Mg—Zn PHASE (%) | Mg$_2$Sn PHASE EXISTENCE OR NONE |
| EXAMPLE | 1 | 0 | 0 | 0 | 13 | 0 | NONE |
| EXAMPLE | 2 | 8 | 2 | 8 | 18 | 0 | EXISTENCE |
| EXAMPLE | 3 | 20 | 5 | 11 | 9 | 15 | NONE |
| EXAMPLE | 4 | 10 | 2 | 15 | 19 | 10 | NONE |
| EXAMPLE | 5 | 29 | 5 | 19 | 22 | 19 | NONE |
| EXAMPLE | 6 | 24 | 4 | 11 | 25 | 12 | NONE |
| EXAMPLE | 7 | 34 | 7 | 32 | 24 | 20 | NONE |
| EXAMPLE | 8 | 34 | 7 | 14 | 13 | 20 | NONE |
| EXAMPLE | 9 | 10 | 4 | 22 | 13 | 20 | NONE |
| EXAMPLE | 10 | 35 | 4 | 13 | 13 | 20 | NONE |
| EXAMPLE | 11 | 44 | 3 | 30 | 22 | 50 | NONE |
| EXAMPLE | 12 | 33 | 8 | 31 | 25 | 23 | NONE |
| EXAMPLE | 13 | 44 | 2 | 38 | 30 | 42 | EXISTENCE |
| EXAMPLE | 14 | 32 | 9 | 29 | 33 | 22 | NONE |
| EXAMPLE | 15 | 29 | 8 | 23 | 31 | 28 | NONE |
| EXAMPLE | 16 | 29 | 6 | 32 | 17 | 16 | NONE |
| EXAMPLE | 17 | 22 | 5 | 27 | 24 | 18 | EXISTENCE |
| EXAMPLE | 18 | 25 | 5 | 23 | 22 | 19 | EXISTENCE |
| EXAMPLE | 19 | 29 | 12 | 28 | 34 | 22 | NONE |
| EXAMPLE | 20 | 33 | 10 | 30 | 40 | 23 | NONE |
| EXAMPLE | 21 | 33 | 11 | 35 | 55 | 24 | NONE |
| EXAMPLE | 22 | 38 | 12 | 30 | 50 | 29 | NONE |
| EXAMPLE | 23 | 36 | 9 | 38 | 60 | 27 | NONE |

TABLE 3B

| | | CROSS SECTIONAL MICROSTRUCTURE | | | | | |
|---|---|---|---|---|---|---|---|
| | | FIRST REGION | | | | | |
| CLASSIFICATION | No. | VALUE ON LEFT SIDE OF FORMULA (1) (%) | THICKNESS (μm) | AREA FRACTION OF Al-CONTAINING PHASE (%) | AREA FRACTION OF Mg—Zn PHASE (%) | AREA FRACTION OF BINARY EUTECTIC STRUCTURE OF Zn/MgZn$_2$ (%) | SECOND REGION THICKNESS (μm) |
| EXAMPLE | 24 | 8.0 | 21 | 0 | 60 | 3 | 38 |
| EXAMPLE | 25 | 8.3 | 28 | 0 | 38 | 8 | 30 |
| EXAMPLE | 26 | 8.0 | 22 | 0 | 34 | 9 | 5 |
| EXAMPLE | 27 | 8.2 | 18 | 0 | 39 | 8 | 15 |
| EXAMPLE | 28 | 8.2 | 19 | 0 | 40 | 9 | 19 |
| EXAMPLE | 29 | 8.2 | 40 | 0 | 37 | 3 | 38 |
| EXAMPLE | 30 | 8.6 | 20 | 0 | 33 | 8 | 49 |
| EXAMPLE | 31 | 8.3 | 19 | 0 | 35 | 7 | 40 |
| EXAMPLE | 32 | 8.3 | 21 | 0 | 36 | 7 | 41 |
| EXAMPLE | 33 | 8.6 | 22 | 0 | 35 | 8 | 38 |
| EXAMPLE | 34 | 8.3 | 33 | 0 | 44 | 3 | 30 |
| EXAMPLE | 35 | 8.3 | 30 | 0 | 40 | 3 | 22 |
| COMPARATIVE EXAMPLE | 36 | 2.0 | 11 | 0 | 3 | 0 | 3 |
| COMPARATIVE EXAMPLE | 37 | | | POOR APPEARANCE | | | |
| COMPARATIVE EXAMPLE | 38 | 2.0 | 15 | 2 | 1 | 0 | 22 |
| COMPARATIVE EXAMPLE | 39 | | | POOR APPEARANCE | | | |

TABLE 3B-continued

| | | | | | | |
|---|---|---|---|---|---|---|
| COMPARATIVE EXAMPLE | 40 | 2.0 | 12 | 2 | 12 | 0 | <u>2</u> |
| COMPARATIVE EXAMPLE | 41 | POOR APPEARANCE |
| COMPARATIVE EXAMPLE | 42 | <u>1.5</u> | 24 | 1 | 12 | 0 | 21 |
| COMPARATIVE EXAMPLE | 43 | 2.0 | 11 | <u>6</u> | 13 | 0 | 20 |
| COMPARATIVE EXAMPLE | 44 | 2.0 | 12 | 1 | 11 | 0 | <u>3</u> |
| COMPARATIVE EXAMPLE | 45 | 2.0 | 12 | 3 | 12 | 0 | 6 |
| COMPARATIVE EXAMPLE | 46 | <u>1.3</u> | 22 | 1 | 13 | 0 | 20 |

| | | CROSS SECTIONAL MICROSTRUCTURE | | | | | |
|---|---|---|---|---|---|---|---|
| | | SECOND REGION | | | THIRD REGION | | |
| | | | AREA FRACTION | | | | |
| CLASSIFICATION | No. | AREA FRACTION OF Mg—Zn PHASE (%) | AREA FRACTION OF BINARY EUTECTIC STRUCTURE OF Zn/MgZn$_2$ (%) | AREA FRACTION OF Fe—Al PHASE | THICKNESS (μm) | AREA FRACTION OF Mg—Zn PHASE (%) | Mg$_2$Sn PHASE EXISTENCE OR NONE |
| EXAMPLE | 24 | 52 | 2 | 41 | 42 | 45 | NONE |
| EXAMPLE | 25 | 29 | 8 | 29 | 31 | 22 | NONE |
| EXAMPLE | 26 | 42 | 9 | 38 | 5 | 33 | NONE |
| EXAMPLE | 27 | 37 | 8 | 44 | 22 | 28 | NONE |
| EXAMPLE | 28 | 37 | 9 | 39 | 19 | 27 | NONE |
| EXAMPLE | 29 | 45 | 2 | 38 | 39 | 39 | NONE |
| EXAMPLE | 30 | 32 | 8 | 35 | 55 | 25 | NONE |
| EXAMPLE | 31 | 33 | 7 | 35 | 45 | 27 | NONE |
| EXAMPLE | 32 | 35 | 7 | 41 | 46 | 29 | NONE |
| EXAMPLE | 33 | 35 | 8 | 40 | 40 | 28 | NONE |
| EXAMPLE | 34 | 43 | 2 | 38 | 33 | 37 | NONE |
| EXAMPLE | 35 | 45 | 2 | 55 | 24 | 40 | NONE |
| COMPARATIVE EXAMPLE | 36 | 11 | 0 | 1 | <u>3</u> | 1 | NONE |
| COMPARATIVE EXAMPLE | 37 | POOR APPEARANCE | | | | | |
| COMPARATIVE EXAMPLE | 38 | 12 | 0 | 0 | 24 | 0 | NONE |
| COMPARATIVE EXAMPLE | 39 | POOR APPEARANCE | | | | | |
| COMPARATIVE EXAMPLE | 40 | 10 | 0 | 1 | <u>2</u> | 0 | NONE |
| COMPARATIVE EXAMPLE | 41 | POOR APPEARANCE | | | | | |
| COMPARATIVE EXAMPLE | 42 | 9 | 0 | 0 | 19 | 0 | NONE |
| COMPARATIVE EXAMPLE | 43 | 8 | 0 | 1 | 18 | 0 | NONE |
| COMPARATIVE EXAMPLE | 44 | 0 | 0 | 0 | 18 | 0 | NONE |
| COMPARATIVE EXAMPLE | 45 | 0 | 0 | 0 | <u>4</u> | 0 | NONE |
| COMPARATIVE EXAMPLE | 46 | 9 | 0 | 0 | 18 | 0 | NONE |

The underline indicates that the value is out of the range of the present invention.

TABLE 4A

| | | PROPERTIES | | | | |
|---|---|---|---|---|---|---|
| CLASSIFICATION | No. | ADHESION | CORROSION RESISTANCE AFTER COATING | RED RUST RESISTANCE | BASE METAL CORROSION RESISTANCE | SACRIFICIAL CORROSION RESISTANCE |
| EXAMPLE | 1 | A | A | A | A | A |
| EXAMPLE | 2 | A | AA | AA | AA | AA |
| EXAMPLE | 3 | AA | AA | AA | AA | AA |

TABLE 4A-continued

| | | | PROPERTIES | | | |
|---|---|---|---|---|---|---|
| CLASSIFICATION | No. | ADHESION | CORROSION RESISTANCE AFTER COATING | RED RUST RESISTANCE | BASE METAL CORROSION RESISTANCE | SACRIFICIAL CORROSION RESISTANCE |
| EXAMPLE | 4 | AA | AA | AA | AA | A |
| EXAMPLE | 5 | AA | AAA | AAA | AAA | AA |
| EXAMPLE | 6 | AA | AA | AA | AA | A |
| EXAMPLE | 7 | AA | AAA | AAA | AAA | AAA |
| EXAMPLE | 8 | A | AAA | AAA | AA | AAA |
| EXAMPLE | 9 | AA | AA | AA | AA | A |
| EXAMPLE | 10 | A | AA | AA | AA | A |
| EXAMPLE | 11 | AAA | AA | AAA | AAA | A |
| EXAMPLE | 12 | AAA | AAA | AAA | AAA | AAA |
| EXAMPLE | 13 | AAA | AA | AAA | AAA | A |
| EXAMPLE | 14 | AAA | AAA | AAA | AAA | AAA |
| EXAMPLE | 15 | AAA | AAA | AAA | AAA | AAA |
| EXAMPLE | 16 | AAA | AAA | AAA | AAA | AA |
| EXAMPLE | 17 | AAA | AAA | AAA | AAA | AAA |
| EXAMPLE | 18 | AAA | AAA | AAA | AAA | AAA |
| EXAMPLE | 19 | AAA | AAA | AAA | AAA | AAA |
| EXAMPLE | 20 | AAA | AAA | AAA | AAA | AAA |
| EXAMPLE | 21 | AAA | AAA | AAA | AAA | AAA |
| EXAMPLE | 22 | AAA | AAA | AAA | AAA | AAA |
| EXAMPLE | 23 | AAA | AAA | AAA | AAA | AAA |

TABLE 4B

| | | | PROPERTIES | | | |
|---|---|---|---|---|---|---|
| CLASSIFICATION | No. | ADHESION | CORROSION RESISTANCE AFTER COATING | RED RUST RESISTANCE | BASE METAL CORROSION RESISTANCE | SACRIFICIAL CORROSION RESISTANCE |
| EXAMPLE | 24 | AAA | AA | AAA | AAA | A |
| EXAMPLE | 25 | AAA | AAA | AAA | AAA | AAA |
| EXAMPLE | 26 | AAA | AAA | AAA | AA | AAA |
| EXAMPLE | 27 | AAA | AAA | AAA | AAA | AAA |
| EXAMPLE | 28 | AAA | AAA | AAA | AAA | AAA |
| EXAMPLE | 29 | AAA | AA | AAA | AAA | A |
| EXAMPLE | 30 | AAA | AAA | AAA | AAA | AAA |
| EXAMPLE | 31 | AAA | AAA | AAA | AAA | AAA |
| EXAMPLE | 32 | AAA | AAA | AAA | AAA | AAA |
| EXAMPLE | 33 | AAA | AAA | AAA | AAA | AAA |
| EXAMPLE | 34 | AAA | AA | AAA | AAA | AA |
| EXAMPLE | 35 | AAA | AA | AAA | AAA | AA |
| COMPARATIVE EXAMPLE | 36 | A | A | B | B | A |
| COMPARATIVE EXAMPLE | 37 | | | POOR APPEARANCE | | |
| COMPARATIVE EXAMPLE | 38 | A | B | B | B | B |
| COMPARATIVE EXAMPLE | 39 | | | POOR APPEARANCE | | |
| COMPARATIVE EXAMPLE | 40 | A | A | B | B | A |
| COMPARATIVE EXAMPLE | 41 | | | POOR APPEARANCE | | |
| COMPARATIVE EXAMPLE | 42 | B | A | A | A | A |
| COMPARATIVE EXAMPLE | 43 | A | B | A | A | A |
| COMPARATIVE EXAMPLE | 44 | A | A | B | A | A |
| COMPARATIVE EXAMPLE | 45 | A | A | A | B | A |
| COMPARATIVE EXAMPLE | 46 | B | A | A | A | A |

Industrial Applicability

The plated steel material of the present invention is excellent in adhesion of the plated layer, corrosion resistance after coating, red rust resistance, base metal corrosion resistance, and sacrificial corrosion resistance. As a result, there is a possibility that the present invention can be applied to the fields of civil engineering and infrastructure and automobile parts.

REFERENCE SIGNS LIST

1 Plated steel material,
1a Surface,
11 Base steel material,
12 Plated layer,
12A First region,
12B Second region,
12C Third region,
13 Boundary line (Interface).

The invention claimed is:

1. A plated steel material comprising: a base steel material; and a plated layer arranged on a surface of the base steel material, wherein
  the plated layer includes, as a chemical composition, in terms of mass %,
    5.0 to 40.0% of Al,
    0.5 to 15.0% of Mg,
    5.0 to 40.0% of Fe,
    0 to 2.0% of Si,
    0 to 2.0% of Ca,
    0 to 1.0% of Ni,
    0 to 5% in total of one or more of:
      0 to 0.5% of Sb,
      0 to 0.5% of Pb,
      0 to 1.0% of Cu,
      0 to 2.0% of Sn,
      0 to 1.0% of Ti,
      0 to 1.0% of Cr,
      0 to 1.0% of Nb,
      0 to 1.0% of Zr,
      0 to 1.0% of Mn,
      0 to 1.0% of Mo,
      0 to 1.0% of Ag,
      0 to 1.0% of Li,
      0 to 0.5% of La,
      0 to 0.5% of Ce,
      0 to 0.5% of B,
      0 to 0.5% of Y,
      0 to 0.5% of P,
      0 to 0.5% of Sr,
      0 to 0.5% of Co,
      0 to 0.5% of Bi,
      0 to 0.5% of In,
      0 to 0.5% of V, and
      0 to 0.5% of W; and
    a balance including Zn and impurities,
  in a cross section perpendicular to a surface of the plated steel material, when observing an observation region which is a cross section of the plated steel material having a predetermined length in a direction parallel to the surface of the plated steel material, a length L of a boundary line between the plated layer and the base steel material satisfies a following formula (1),
  the plated layer includes a first region which is arranged at the surface of the plated steel material and where an Fe concentration is less than 5.0 mass %, a second region which is adjacent to the first region and where an Fe concentration is 5.0 mass % or more and less than 30.0 mass %, and a third region which is arranged between the second region and the base steel material and where an Fe concentration is 30.0 mass % or more and 80.0 mass % or less,
    a thickness of the first region is 5 to 100 μm,
    a thickness of the second region is 5 to 100 μm,
    a thickness of the third region is 5 to 100 μm,
  the first region includes an Al-containing phase at an area fraction of 0% or more and less than 5%, the Al-containing phase including Zn and 20 to 99 mass % of Al; and $$(L - L_0)/L_0 \times 100 \geq 2.0(\%), \tag{1}$$

herein, in the formula (1), $L_0$ is a linear distance between one end and another end of the boundary line in the observation region, and L is a length of the boundary line between the one end and the other end.

2. The plated steel material according to claim 1, wherein a following formula (2) is satisfied, $$(L - L_0)/L_0 \times 100 \geq 4.0(\%), \tag{2}$$

herein, in the formula (2), $L_0$ is a linear distance between one end and another end of the boundary line in the observation region, and L is a length of the boundary line between the one end and the other end.

3. The plated steel material according to claim 1, wherein a following formula (3) is satisfied, $$(L - L_0)/L_0 \times 100 \geq 6.0(\%), \tag{3}$$

herein, in the formula (3), $L_0$ is a linear distance between one end and another end of the boundary line in the observation region, and L is a length of the boundary line between the one end and the other end.

4. The plated steel material according to claim 1, wherein the thickness of the first region is 15 to 100 μm.

5. The plated steel material according to claim 1, wherein the area fraction of the Al-containing phase in the first region is less than 1%.

6. The plated steel material according to claim 1, wherein the first region includes a Mg—Zn phase including Zn and 20 to 60 mass % of Mg, and an area fraction of the Mg—Zn phase in the first region is 2% or more.

7. The plated steel material according to claim 1, wherein the first region includes a binary eutectic structure of a Zn phase and a Mg—Zn phase, and an area fraction of the binary eutectic structure in the first region is 1% or more.

8. The plated steel material according to claim 1, wherein the thickness of the second region is 15 to 100 μm.

9. The plated steel material according to claim 1, wherein the second region includes a Mg—Zn phase including Zn and 20 to 60 mass % of Mg, and an area fraction of the Mg—Zn phase in the second region is 5% or more.

10. The plated steel material according to claim 1, wherein the second region includes an Fe—Al alloy phase having an equivalent circle diameter of 15 μm or less and an aspect ratio of 2 or more, and an area fraction of the Fe—Al alloy phase in the second region is 5% or more.

11. The plated steel material according to claim 1, wherein the second region includes a binary eutectic structure of a Zn phase and a Mg—Zn phase, and an area fraction of the binary eutectic structure in the second region is 2% or more.

12. The plated steel material according to claim 1, wherein the thickness of the third region is 15 to 100 μm.

13. The plated steel material according to claim 1, wherein the third region includes a Mg—Zn phase including Zn and 20 to 60 mass % of Mg, and an area fraction of the Mg—Zn phase in the third region is 10% or more.

14. The plated steel material according to claim 1, wherein, in the chemical composition of the plated layer, a content percentage of Mg, in mass %, to a total amount of Zn and Mg (Mg/(Zn+Mg)) is 5.0% or more.

15. The plated steel material according to claim 1, wherein, in the chemical composition of the plated layer, a content percentage of Mg, in mass %, to a total amount of Zn and Mg (Mg/(Zn+Mg)) is 6.5% or more.

16. The plated steel material according to claim 1, wherein the plated layer includes 0.02 to 2.0 mass % of Sn, and the plated layer includes a $Mg_2Sn$ phase.

* * * * *